United States Patent
Laleg et al.

(10) Patent No.: US 11,944,937 B2
(45) Date of Patent: Apr. 2, 2024

(54) MODEL-FREE CONTROLLER AND METHOD FOR SOLAR-BASED DISTILLATION SYSTEM

(71) Applicant: KING ABDULLAH UNIVERSITY OF SCIENCE AND TECHNOLOGY, Thuwal (SA)

(72) Inventors: Taous Meriem Laleg, Thuwal (SA); Paul Bendevis, Thuwal (SA); Ayman Mustafa Karam, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 397 days.

(21) Appl. No.: 17/285,669

(22) PCT Filed: Oct. 2, 2019

(86) PCT No.: PCT/IB2019/058395
§ 371 (c)(1),
(2) Date: Apr. 15, 2021

(87) PCT Pub. No.: WO2020/079515
PCT Pub. Date: Apr. 23, 2020

(65) Prior Publication Data
US 2021/0394119 A1 Dec. 23, 2021

Related U.S. Application Data

(60) Provisional application No. 62/747,328, filed on Oct. 18, 2018.

(51) Int. Cl.
*B01D 61/36* (2006.01)
*C02F 1/44* (2023.01)
*C02F 103/08* (2006.01)

(52) U.S. Cl.
CPC ......... *B01D 61/368* (2013.01); *B01D 61/364* (2013.01); *C02F 1/447* (2013.01);
(Continued)

(58) Field of Classification Search
CPC ............... B01D 61/368; B01D 61/364; B01D 2311/103; B01D 2311/165;
(Continued)

(56) References Cited

U.S. PATENT DOCUMENTS 5,596,981 A * 1/1997 Soucy ..................... F24S 80/58
126/707
6,055,524 A * 4/2000 Cheng .................. G05B 13/027
706/14
(Continued)

FOREIGN PATENT DOCUMENTS

AU 2015200710 A1 * 10/2005 ............... F24H 1/18
CN 10538040 A * 12/2015 ............. G05D 23/30
(Continued)

OTHER PUBLICATIONS

English Translation of Zhao et al Patent Publication CN105138040A, published Dec. 2015. (Year: 2015).*
Baskaran et al, "Desalination of Well water by Solar Power Membrane Distillation and Reverse Osmosis and its Efficiency Analysis", Published in International Journal of ChemTech Research, vol. 6, No. 5, pp. 2628-2636, published Aug.-Sep. 2014. (Year: 2014).*
(Continued)

*Primary Examiner* — Joseph W Drodge
(74) *Attorney, Agent, or Firm* — PATENT PORTFOLIO BUILDERS PLLC

(57) ABSTRACT

A method for controlling a membrane distillation system includes determining whether there is a day time or a night time at a location of a solar collector system associated with the membrane distillation system; applying a first control mode during the day time to a flow velocity of a feed used by the membrane distillation system; and applying a second (Continued)

control mode, different from the first control scheme, during the night time, to the feed. The first control scheme is a model-free mode.

14 Claims, 30 Drawing Sheets

(52) U.S. Cl.
CPC .............. *B01D 2311/1031* (2022.08); *B01D 2311/165* (2013.01); *B01D 2311/20* (2013.01); *B01D 2311/22* (2013.01); *B01D 2313/243* (2013.01); *B01D 2313/367* (2022.08); *C02F 2103/08* (2013.01); *C02F 2201/009* (2013.01); *C02F 2209/005* (2013.01); *C02F 2209/02* (2013.01); *C02F 2209/40* (2013.01)

(58) Field of Classification Search
CPC ............ B01D 2311/20; B01D 2311/22; B01D 2313/243; B01D 2313/36; B01D 2311/10; B01D 61/10; B01D 61/12; B01D 61/20; B01D 61/22; B01D 61/36; B01D 65/08; B01D 65/10; B01D 2311/04; B01D 2311/06; B01D 2311/16; B01D 2313/65; C02F 1/447; C02F 2103/08; C02F 2201/009; C02F 2209/005; C02F 2209/02; C02F 2209/40; C02F 2209/006; C02F 2209/03; C02F 2311/04; C02F 2311/16; Y02W 10/37; Y02A 20/212; G05B 13/045; G05B 17/02; G06F 17/13; G16C 99/00

See application file for complete search history.

(56) References Cited

U.S. PATENT DOCUMENTS

| | | | | |
|---|---|---|---|---|
| 2005/0038532 | A1* | 2/2005 | Cheng | G05B 11/32 700/20 |
| 2011/0040393 | A1* | 2/2011 | Cheng | G05B 13/02 700/42 |
| 2012/0055157 | A1* | 3/2012 | Gulen | F01K 3/16 60/659 |
| 2017/0166455 | A1* | 6/2017 | Walker | B01D 3/007 |
| 2017/0275190 | A1* | 9/2017 | Eziyi | F01K 25/08 |
| 2018/0361320 | A1* | 12/2018 | Laleg | B01D 61/366 |

FOREIGN PATENT DOCUMENTS

| | | |
|---|---|---|
| WO | 2017002077 A1 | 1/2017 |
| WO | 2017046712 A1 | 3/2017 |

OTHER PUBLICATIONS

Chang, H., et al., "Modeling and Optimization of a Solar Driven Membrane Distillation Desalination System," Renewable Energy, May 15, 2010, vol. 35, pp. 2714-2722, Elsevier Ltd.
Chen, Y.-H., et al., "Optimal Design and Control of Solar Driven Air Gap Membrane Distillation Desalination Systems," Applied Energy, Mar. 30, 2012, vol. 100, pp. 193-204, Elsevier Ltd.
Gil, J.D., et al., "Solar Membrane Distillation: A Control Perspective," 2015 23rd Mediterranean Conference on Control and Automation (MED), Jun. 16-19, 2015, Torremolinos, Spain, pp. 796-802, IEEE.
Gil, J.D., et al., "Using a Nonlinear Model Predictive Control Strategy for the Efficient Operation of a Solar-Powered Membrane Distillation System," 2017 25th Mediterranean Conference on Control and Automation (MED), Jul. 3-6, 2017, Valletta, Malta, pp. 1189-1194, IEEE.
International Search Report in corresponding/related International Application No. PCT/IB2019/058395, dated Jan. 20, 2020.
Written Opinion of the International Searching Authority in corresponding/related International Application No. PCT/IB2019/058395, dated Jan. 20, 2020.
Eleiwi, F., et al., Nonlinear Observer-Based Lyapunov Boundary Control of Distributed Heat Transfer Mechanisms for Membrane Distillation Plant, Journal of Process Control, Sep. 19, 2016, vol. 47, pp. 78-86, Elsevier Ltd.
Eleiwi, F., et al., "Observer-Based Perturbation Extremum Seeking Control with Input Constraints for Direct-Contact Membrane Distillation Process," International Journal of Control, May 22, 2017, vol. 91, No. 6, pp. 1363-1375, Taylor & Francis Group.
Gil, J.D., et al., "Optimal Operation of a Solar Membrane Distillation Pilot Plant via Nonlinear Model Predictive Control," Computers and Chemical Engineering, Nov. 14, 2017, vol. 109, pp. 151-165, Elsevier Ltd.
Karam, A.M, et al., "Electrical Thermal Networks for Direct Contact Membrane Distillation Modeling," 2014 IEEE Conference on Control Applications (CCA), Part of 2014 IEEE Multi-conference on Systems and Control, Oct. 8-10, 2014, Antibes, France, pp. 1563-1569, IEEE.
Karam, A.M., et al., "Analysis of Direct Contact Membrane Distillation Based on a Lumped-Parameter Dynamic Predictive Model," Desalination, Oct. 2, 2016, vol. 402, pp. 50-60, Elsevier B.V.
Karam, A.M., et al., "Electrical Equivalent Thermal Network for Direct Contact Membrane Distillation Modeling and Analysis," Journal of Process Control, Sep. 19, 2016, vol. 47, pp. 87-97, Elsevier Ltd.
Porrazzo, R., et al., "A Neural Network-Based Optimizing Control System for a Seawater-Desalination Solar-Powered Membrane Distillation Unit," Computers and Chemical Engineering, Mar. 26, 2013, vol. 54, pp. 79-96, Elsevier Ltd.
First Examination Report in corresponding/related Saudi Arabian Patent Application No. 521421785, dated Mar. 20, 2023.

* cited by examiner

Measure Initial State $Y_0$ ;
while $t_i \leq T_{end}$ do
  Find Optimal Control over Next 24-hour Window, $u^i$;
  Apply first step of control to system, $u^i_0$ ;
  Step system forward by $\Delta t$ ;
  Measure resulting state $Y_i$ ;
end
Optimal Control, $u = [\, u\_0^0,\, u\_0^1,\, ...]$ ;

FIG. 3

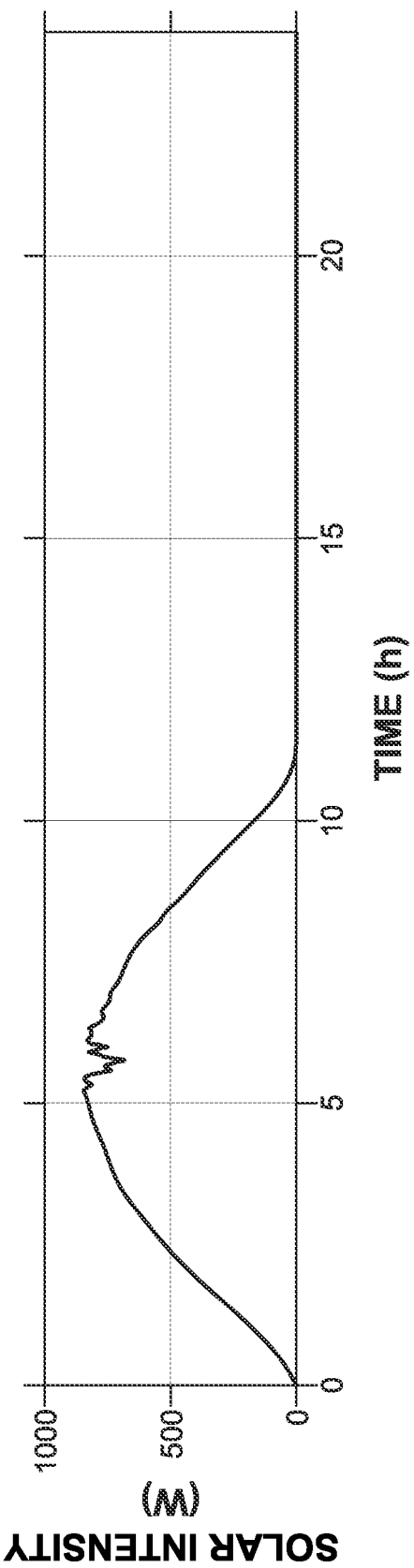

TABLE I

| Parameter | Description | Value |
|---|---|---|
| $V$ | Tank Volume | $25^3$ cm$^3$ |
| $w$ | DCMD Module Width | 15 cm |
| $l$ | DCMD Module Length | 40 cm |
| $\delta$ | DCMD Membrane Thickness | 110 μm |
| $r$ | Pore Radius | 0.28 μm |
| $\epsilon$ | Membrane Porosity | 0.83 |
| $\tau$ | Membrane Tortuosity | 1.7 |
| $nCell$ | Number of Cells in Discretization | 10 |

FIG. 15A

TABLE II

| Parameter | Description | Value |
|---|---|---|
| $V$ | Tank Volume | $50^3$ cm$^3$ |
| $w$ | DCMD Module Width | 60 cm |
| $l$ | DCMD Module Length | 100 cm |
| $d$ | DCMD Module Depth | 3 mm |
| $\gamma$ | Solar Coupling Factor | 5 |
| $nCell$ | Number of Cells in Discretization | 20 |

FIG. 15B

MODEL-FREE CONTROLLER AND METHOD FOR SOLAR-BASED DISTILLATION SYSTEM

CROSS-REFERENCE TO RELATED APPLICATIONS

This application is a U.S. National Stage Application of International Application No. PCT/IB2019/058395, filed on Oct. 2, 2019, which claims priority to U.S. Provisional Patent Application No. 62/747,328, filed on Oct. 18, 2018, entitled "OPTIMAL SOLAR THERMAL MEMBRANE DISTILLATION SYSTEM," the disclosure of which is incorporated herein by reference in its entirety.

BACKGROUND

Technical Field

Embodiments of the subject matter disclosed herein generally relate to a distillation system and method for generating fresh water from a feed, and more particularly, to a controller for such a distillation system that controls a water distillation process in an efficient way.

Discussion of the Background

Membrane distillation (MD) is a water desalination technology that has been growing over the past decade due to its high potential for sustainably desalinating the water. MD is a thermally driven separation process, in which only water vapor or other volatile molecules from the feed (also called contaminated water) are transported through a microporous hydrophobic membrane while the contaminants move along the membrane along a separate path. The contaminated water may be salt water, brackish water, industrial water, waste water, etc. The MD system can operate with low-thermal energy input, for example, it can be powered by solar collectors or industrial thermal waste.

A conventional configuration of an MD system 100 includes, as shown in FIG. 1, a feed part 110 and a permeate part 140, which are separated by the hydrophobic membrane 150. This membrane only allows water in the vapor state to pass through, from the feed part 110 to the permeate part 140. Water vapor is driven through the membrane by the pressure difference caused by the temperature gradient between the hot feed on the feed part 110 and the cool fresh water on the permeate part 140. Potable or fresh water 142 is produced as the pure water vapor condenses at the permeate part 140.

The feed part 110 includes a feed tank 111 that is configured to hold the feed 112 (i.e., contaminated water). A solar thermal collector system 114 (for example, one or more solar panels) are used to transform the sun energy 116 into heat and the heat is transferred to the feed 112 via a piping system 118. A feed pump 120 is connected to the tank 111 and to a second piping system 122 for forcing the heated feed to a feed heat exchange device 124. The feed heat exchange, in its simplest implementation, may be a large diameter tube. The tube may have a rectangular cross-section. The feed heat exchange device 124 sandwiches with a permeate heat exchange device 144, the membrane 150. The permeate heat exchange device may have a similar configuration as the feed heat exchange device. The membrane 150 may be any known membrane that is used in the distillation industry.

Water vapors 126 from the heated permeate 112 traverse the membrane 150 into the permeate heat exchange device 144, and the vapors 126 are then taken by the fresh water 142 to a fresh water tank 146. The flow of the vapors 126 and the fresh water 142 to the fresh water tank 146 is ensured by a permeate pump 148 that is connected to the piping system 149. FIG. 1 also shows the temperature T and the mass M of the feed in and out and permeate in and out of the feed heat exchange device 124 and the permeate heat exchange device 144, respectively.

The feed heat exchange device 124, the membrane 150, and the permeate heat exchange device 144 form the Direct Contact Membrane Distillation (DCMD) module 160. In this embodiment, the membrane 150 is in direct contact with both the hot feed 112 and the cooler fresh water permeate 142, as illustrated in the figure. Note that the first fluid loop through the feed part 110 is a closed loop of fluid that is heated by the solar collector system 114 and transports the thermal energy to the feed tank 111. Then, the feed 112 is circulated from the feed tank 111 through to the DCMD module 160 and back to the feed tank 111 through the piping 122. In one embodiment, it is possible to replace the solar collector system 114 with another heat collector system, for example, a waste heat in a power plant. Those skilled in the art will understand that any other heat collector systems may be used.

The permeate 142 is pumped from the fresh water tank 146 into the DCMD module 160 by a permeate pump 148. At the DCMD module 160, the permeate 142 collects the distilled water vapors 126 and flows back into the fresh water tank 146 through the piping 149. The inclusion of the solar collector system 114 and the feed tank 111 allows for dynamic energy storage, which can be exploited to improve the efficiency of the MD system 100 under real operating conditions.

Although the MD system 100 has a lower permeate production than conventional desalination technologies, such as reverse osmosis or multiple-effect distillation, the MD system is attractive for its use of sustainable energy (e.g., solar energy) and for its low temperature and pressure working conditions. There is current research to increase the thermal efficiency of the MD system via alternative module designs and heat recovery systems. More recently, the length of the DCMD multi-stage module was optimized for maximum permeate production. However, despite the MD system's many attractive properties, the lower permeate production is still limiting its widespread commercialization. The control of this system is also a limiting factor in the widespread commercialization as the control system is complex.

Thus, there is a need for an MD system having a simple control system that can generate fresh water in an efficient way.

BRIEF SUMMARY OF THE INVENTION

According to an embodiment, there is a method for controlling a membrane distillation system. The method includes determining whether there is a day time or a night time at a location of a solar collector system associated with the membrane distillation system, applying a first control mode during the day time to a flow velocity of a feed used by the membrane distillation system, and applying a second control mode, different from the first control scheme, during the night time, to the feed. The first control scheme is a model-free mode.

According to another embodiment, there is a controller configured to control a membrane distillation system, and the controller includes an input/output interface for receiving information about whether there is a day time or a night time at a location of a solar collector system associated with the membrane distillation system, and a processor connected to the input/output interface. The processor is configured to apply a first control mode during the day time to a flow velocity of a feed used by the membrane distillation system, and apply a second control mode, different from the first control mode, during the night time to the feed. The first control mode is a model-free scheme.

According to still another embodiment, there is a membrane distillation system that includes a solar collector system configured to collect solar energy and supply heat, a feed tank configured to hold a feed that is heated by the heat from the solar collector system, a membrane that is configured to receive the feed on one side and allow only water vapor to pass through the membrane on the other side to generate fresh water, a feed pump configured to circulate the feed with a flow velocity, from the feed tank to the membrane and back, and a controller configured to control the feed pump by applying a first control mode during a day time, to the flow velocity of the feed, and by applying a second control mode during a night time, different from the first control mode, to the feed. The first control mode is a model-free scheme.

BRIEF DESCRIPTION OF THE DRAWINGS

For a more complete understanding of the present invention, reference is now made to the following descriptions taken in conjunction with the accompanying drawings, in which:

FIGS. 3 and 4 illustrate a model predictive control algorithm for calculating a flow velocity of the feed in the MD system;

FIG. 9C illustrates the solar intensity experienced by the system during the observed period of time;

FIG. 15A illustrates the sizes and various parameters of the MD system tested, and FIG. 15B illustrates the sized and various parameters of a scaled-up MD system;

DETAILED DESCRIPTION OF THE INVENTION

Figure 1:
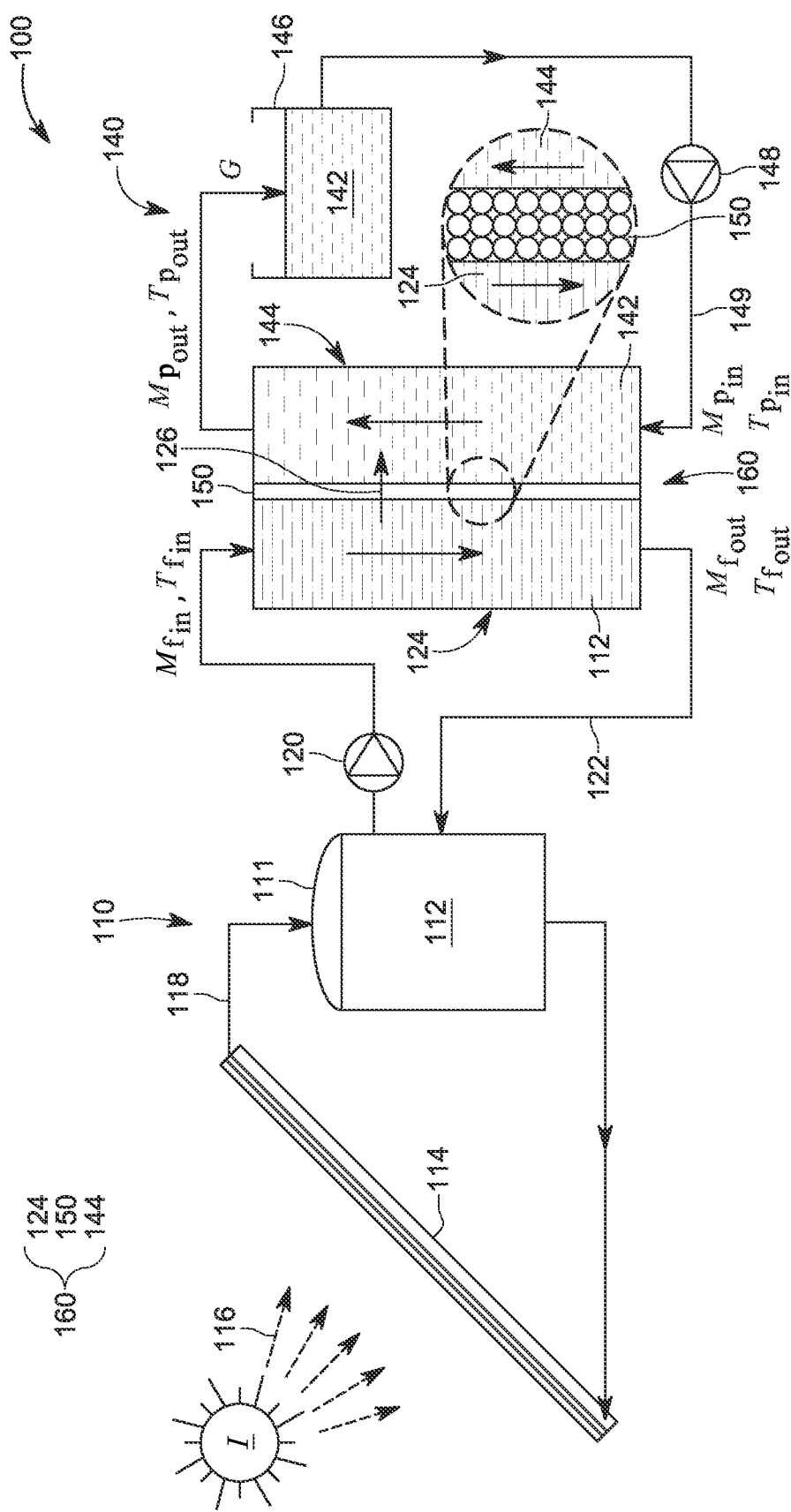
FIG. 1 illustrates an MD system that uses a greedy controller for controlling fresh water generation.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an MD system that uses solar energy for producing fresh water. However, the embodiments to be discussed next are not limited to such a system, but may be applied to an MD system that user another source of energy.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel, model-free controller fora solar thermal membrane distillation system is introduced. In one application, the model-free controller is a bang-bang controller and this controller is implemented for the operation of the MD system during a day-time. During the night time, the controller is implemented as a greedy controller. Note that a greed controller is based on a greed algorithm, which is known in the art. Alternatively, another control model may be used during the night time as long as the night time control is different from the day time control.

Using a simplified, optimal control for the MD system is one way to make this technology more attractive for being implemented in practice. The optimal control techniques seek to maximize fresh water production in more practical settings by considering the whole system of the solar-powered DCMD and using variable inlet flow rates as a control signal.

Unlike reverse osmosis technology, where the energy optimal operation problem has been investigated from a control perspective, the control problem for the MD system is relatively unexplored. There have been few attempts for control design for the MD system. For example, a Lyapunov-based controller to stabilize the temperature difference across the DCMD membrane has been proposed in [1], and a proportional-integral controller for tracking optimal feed inlet temperature set points calculated by an offline optimization method has been proposed in [2].

However, due to the stochasticity of the solar energy, a real-time optimal control is more suitable than only temperature state-feedback control. Therefore, a real-time extremum seeking controller was developed to optimize the water flux by manipulating the feed and permeate inlet flow rates for any given inlet temperature in [3], [4]. Another approach, based on neural network feed-forward, was proposed for the control of solar-MD systems in [5]. The most complete optimal control study of solar-MD was developed in [6], where a two-mode nonlinear model predicative controller (MPC) is designed to optimize various cost functions combining efficiency, production, and financial cost. The dynamics of the MD module are linearly approximated and the control signals are the set-points of the solar field outlet temperature and the flow rate between the feed storage tank and the loop feeding the module.

The novel controller to be discussed herein differs from [6] in at least three ways. Firstly, the novel controller uses a nonlinear dynamic model developed from the thermodynamic principle for calculating the flux across the DCMD module rather than a linear approximation. Secondly, the novel controller uses the flow velocities on the feed and permeate sides of the DCMD module as the control parameters, and the daily fresh water production as the objective function to be maximized. Lastly, in making use of the full nonlinear dynamics of the system, the novel controller is implemented, at least during the day time, as a bang-bang model-free optimal controller for the MD system. The performance of the novel controller using different switching curves is explored and is shown to outperform the conventional control using a fixed feed inlet velocity set-point.

Figure 2:
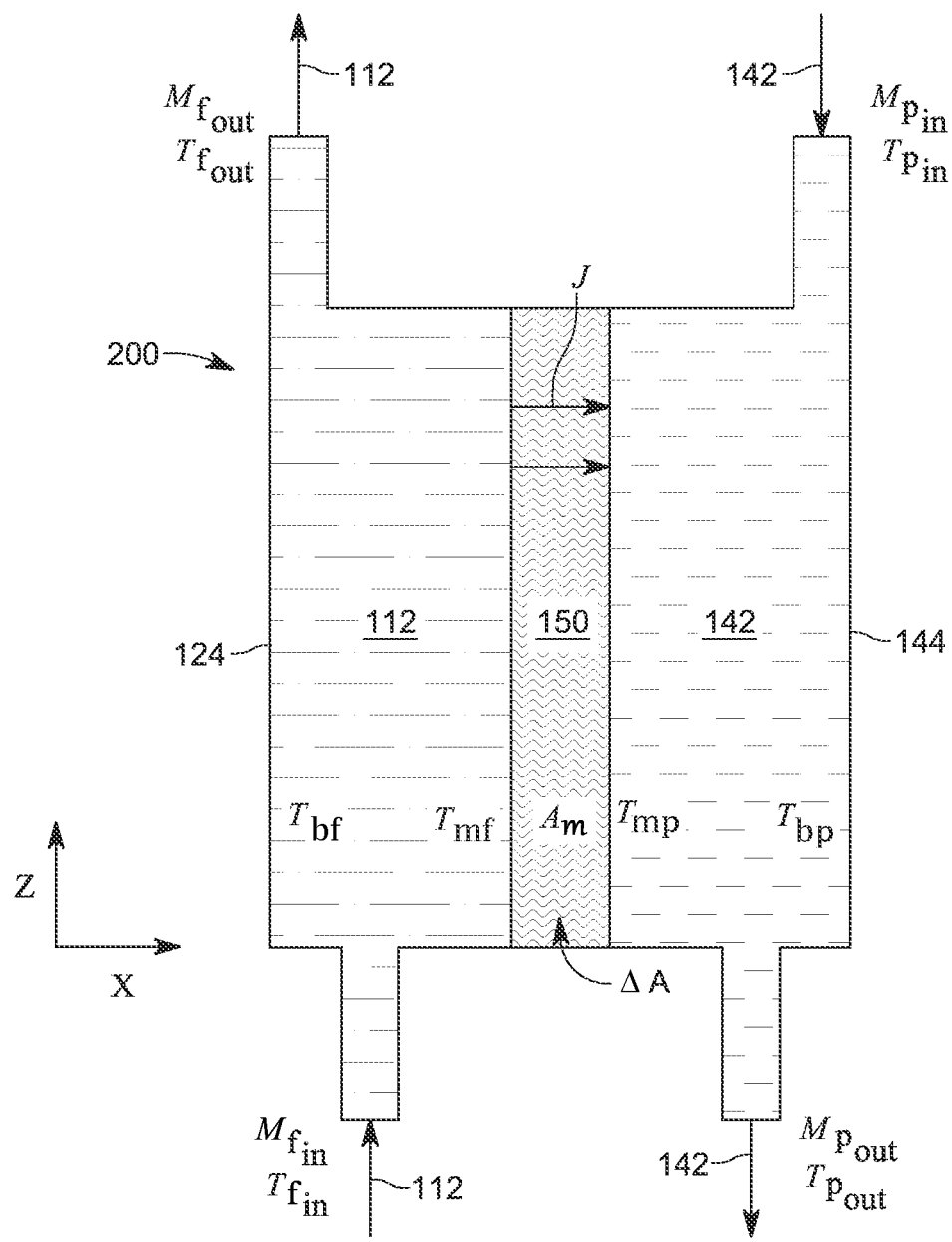
FIG. 2 illustrates a cell of the DCMD module, which is used for calculation purposes.

Prior to discussing the novel model in more detail, a DCMD model is discussed. The DCMD model has been proposed and experimentally validated in [7, 8]. This model is computationally efficient, which allows for real time control. The DCMD module 160 is decomposed into a number of small bulk volume cells 200, as illustrated in FIG. 2. For example, in one embodiment, the DCMD module 160 is split into 5 to 8 cells 200. Each cell 200 includes a slice of the feed heat exchange device 124, the membrane 150, and the permeate heat exchange device 144. Applying energy and mass conservation laws to each cell 200 results in a nonlinear system of Differential Algebraic Equations (DAE). A compact representation of the DAE model is given in the following form (the detailed model can be found in [7]), $$E\dot{X}=F(X,u)X+B(u) \quad (1)$$

where $X \in \mathbb{R}^{6N+4}$ represents the differential and algebraic states of the system, N is the number of cells, $\dot{X}$ refers to the time derivative of the state vector, E is a singular matrix called the mass matrix, which satisfies rank[E]<6N+4, F(X (t),u(t))$\in \mathbb{R}^{(6N+4)\times(6N+4)}$ and is non-linear in the states X and input speed u, and B(u(t))$\in \mathbb{R}^{6N+4}$ represents the input channels into the system, which are the feed and permeate inlet temperatures ($T_f$, $T_{p_i}$) and flow velocities ($M_{f_i}$, $M_{p_i}$). The output vector for the production rates along the membrane is considered to be Y.

The fresh water production rates along the membrane 150 are given by the output vector Y, which can be expressed as:

$$Y = \mathcal{J}(T_{mf}, T_{mp}) * \Delta A \quad (2)$$

where $\mathcal{J}$ is the mass flux of vapor 126 passing through the membrane 150, from the feed part 124 into the permeate part 144 in FIG. 2, and is expressed in kgm$^{-2}$s$^{-1}$, $T_{mf}$ is the temperature of the feed next to the membrane, $T_{mp}$ is the temperature of the permeate next to the membrane, and $\Delta A$ is the area between parts 124 and 144, also shown in FIG. 2. FIG. 2 also shows the temperature $T_{bf}$ of the feed away from the membrane, and the temperature $T_{bp}$ of the permeate away from the membrane.

In addition to the DCMD model expressed by equations (1) and (2) above, a model for the feed tank 111's temperature is now discussed. It is assumed herein that the solar irradiance, I(t), is collected by the solar collector system 114 having an area $A_{sc}$, and is transferred to the fee tank 111 with an efficiency γ. The feed tank 111 has a volume V, and is modeled by a single state assuming perfect mixing inside the tank. Pipes 118 and 122, with a cross-sectional area A, pump the feed 112 (e.g., salt water) with a velocity u in the closed loop that fluidly connects the feed tank 111 to the DCMD module 160. The outlet temperature of the feed side is denoted by $T_{f_{out}}$. The feed tank's energy is considered to be $E_{tank}(t,u)$ and the feed tank's temperature is considered to be $T_{tank}(t,u)$. Then the model for the feed tank can be described as:

$$\dot{E}_{tank}=\gamma A_{sc}I(t)+[T_{fout}-T_{tank}]\rho c u A, \quad (3)$$

where ρ is the density of the feed and c is the latent heat of the feed. However, the energy of the feed can also be expressed as:

$$\dot{E}_{tank}=Vc\rho\dot{T}_{tank}. \quad (4)$$

When equations (3) and (4) are combined, the following equation is obtained for the feed tank's temperature:

$$\dot{T}_{tank} = \frac{\gamma A_{sc}}{Vc\rho}I(t) + \frac{[T_{fout}-T_{tank}]uA}{V}. \quad (5)$$

Typical values may be used for the physical and thermal properties of the feed water 112 when calculating the fresh water production. The solar collector system 114 is modeled with a single term, I(t), which represents the incident solar radiation on the solar collector system 114. The solar irradiance may be modeled with a neural network trained on actual historical data in Jeddah, Saudi Arabia.

Initially, a model predictive control (MPC) has been implemented for the MD system 100. MPC algorithms have been widely used in the industry, especially in the chemical process industry, due to their ability to account for the process and operation constraints and the existing different interactions of the process variables. The MPC algorithm is an online model-based control strategy that calculates an optimal input of the process with respect to predefined performance criteria and uses a dynamic model of the controlled system. The MPC algorithm allows to predict the evolution of the process variables over a finite time horizon.

It arises naturally as an optimal feedback control strategy and can handle nonlinearities and constraints in systems.

Figure 4:
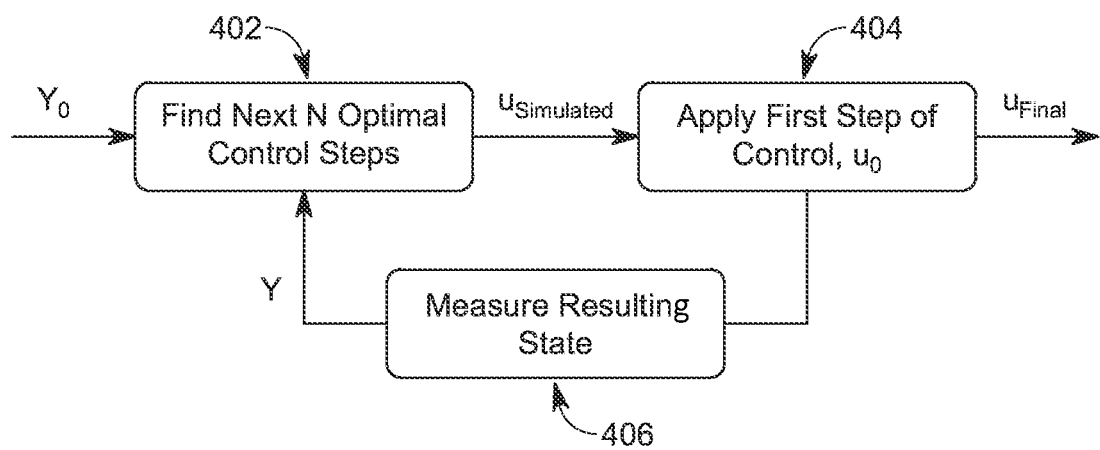

The basic idea of the MPC algorithm is to perform an optimization over a finite window of the next $N_t$ control steps. Then, the first control step is applied and the resulting state $Y_i$ is measured. After that, the optimization window slides back by one discretization step and the process is repeated. The algorithm is illustrated in FIG. 3 and the flow is illustrated in FIG. 4. More specifically, the initial state $Y_0$ of the system is first measured and then it is input to a loop that continues as long as the current time $t_i$ is smaller than or equal to an end time $T_{end}$. In the loop, as shown in FIGS. 3 and 4, the optimal control parameters for the next N control steps are found in step 402, over a 24-h window $u^i$. The simulated control parameters for the first step $u_0^i$, which are part of the simulated N steps $u_{simulated}$, are then input in step 404 and applied to the system. The system is moved forward with these control parameters for a time $\Delta t$, after which the resulting state $Y_i$ is measured in step 406. Steps 402 to 406 are then repeated until the current time $t_i$ becomes larger than the end time $T_{end}$.

Equipped with these models, the total fresh water production of the MD system 100 is optimized using the inlet feed and permeate velocities as the discrete control parameter $u_i$. For simplicity, the symmetric case in which the feed velocity $v_f$ and permeate velocity $v_p$ are equal is investigated. Using the established control notations, the following quantities are defined:

$$u_i = v_f(i^*\Delta t) = v_p(i^*\Delta t), \quad i=1, \ldots N_t \quad (6)$$

where $\Delta t$ is the time between samples, and "i" is the index of the discrete control input. The optimal control formulation for the fresh water production G is given by the following equation:

$$\max_{u \in \mathcal{U}} G = \max_{u \in \mathcal{U}} \sum_{i=1}^{N_t} Y_i \Delta t \quad (7)$$

where $$\mathcal{U} = \{u \mid 0 \text{ m/s} \leq u_i \leq 1 \text{ m/s}\}. \quad (8)$$

The bounded control signal is normalized between 0 m/s and 1 m/s to not exceed the liquid entry pressure. The liquid entry pressure is defined as that pressure that would allow the salt in the feed to pass through the membrane. For the MD system 100, only the water vapor 126 should be able to pass through the membrane 150, and not the salt or other contaminants of the water.

The production rate of the fresh water increases as the feed flow velocity increases. The typical control strategy used by the existing MD systems to achieve maximum fresh water production is to set the velocity of the feed to the maximum rate, subject to the minimum liquid entry pressure. This strategy is called the "greedy" control because at any moment it is maximizing the instantaneous fresh water production rate. The greedy strategy will serve as the baseline against which the two new controller designs are compared.

Figure 5A:
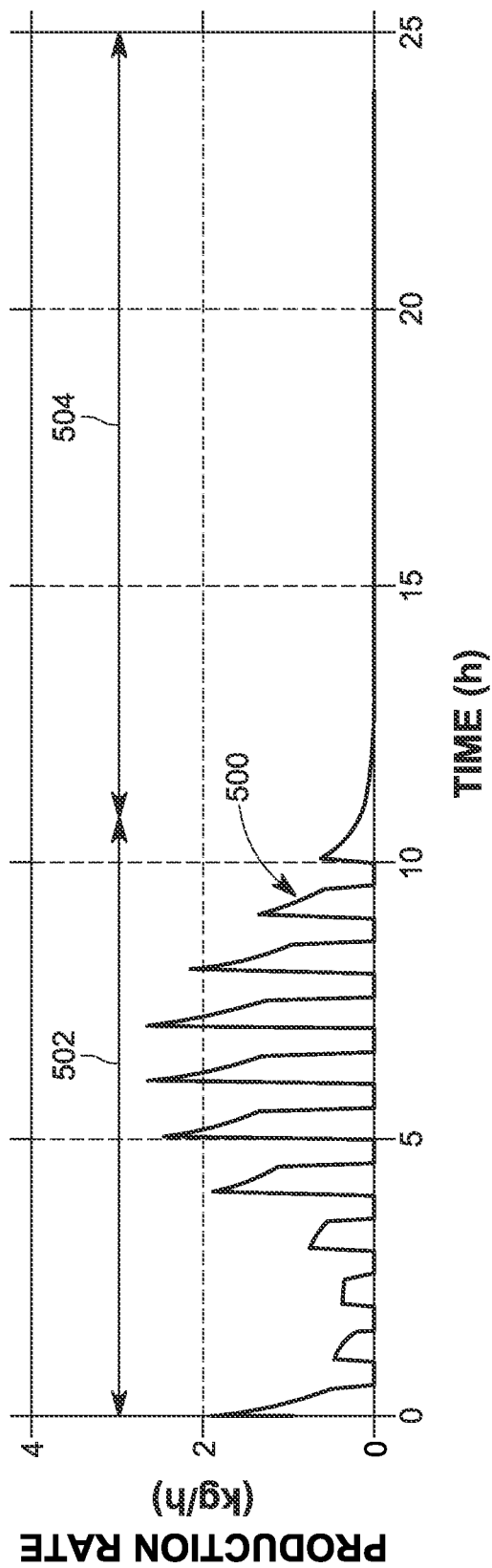
FIG. 5A illustrates the fresh water production rate of an MD system controlled with the model predictive control algorithm and FIG. 5B illustrates the fresh water production for the same system.
Figure 5B:
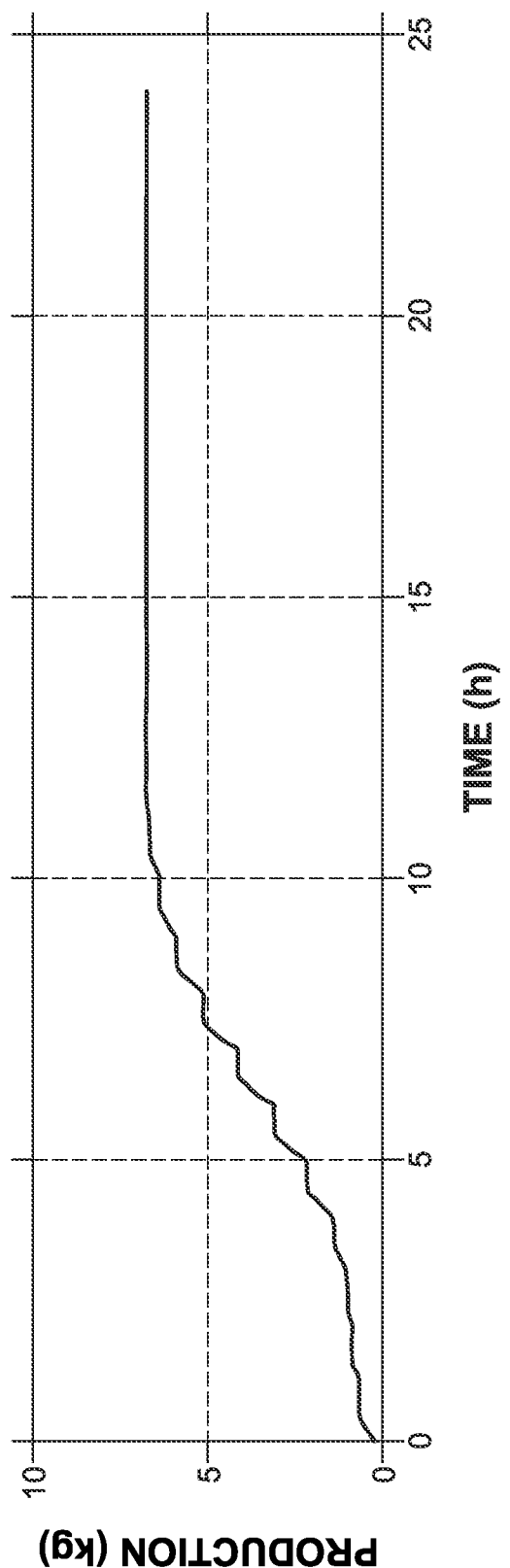

The response of the nonlinear MPC model, which is illustrated in FIGS. 3 and 4, was first studied in the context of the MD system 100. Because no disturbances are considered, the MPC controller evolves during the simulation according to the first optimization step (step 404 in FIG. 4). Thus, only one step of the MPC optimization was run over a 24-hour period. The optimal control is found using a global optimization algorithm (e.g., Matlab's pattern search algorithm with 500 iterations). After the optimization concludes, the resultant fresh water production rate is shown in FIG. 5A and the fresh water production G is shown in FIG. 5B.

Figure 6A:
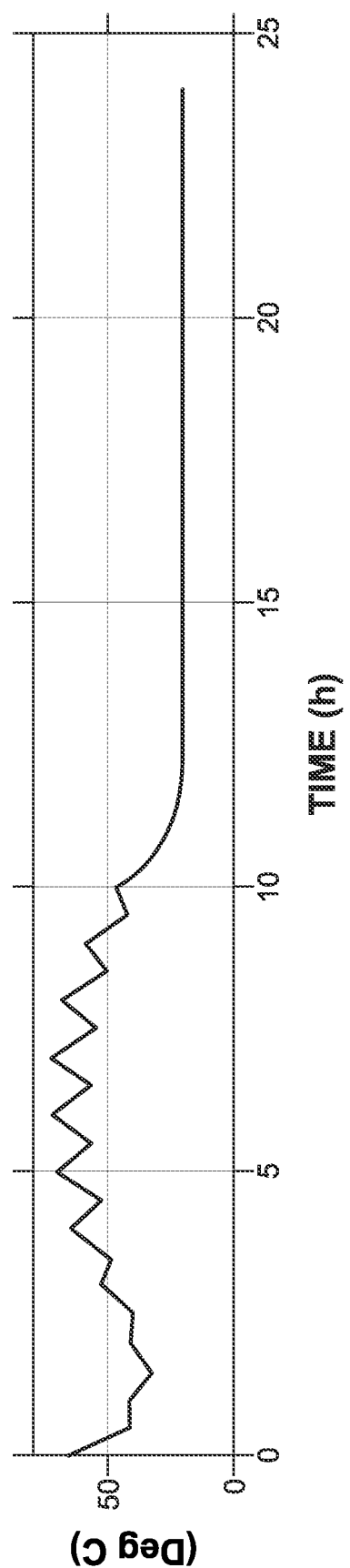
FIG. 6A illustrates a feed tank temperature of the MD system controlled by the model predictive control algorithm over time.
Figure 6B:
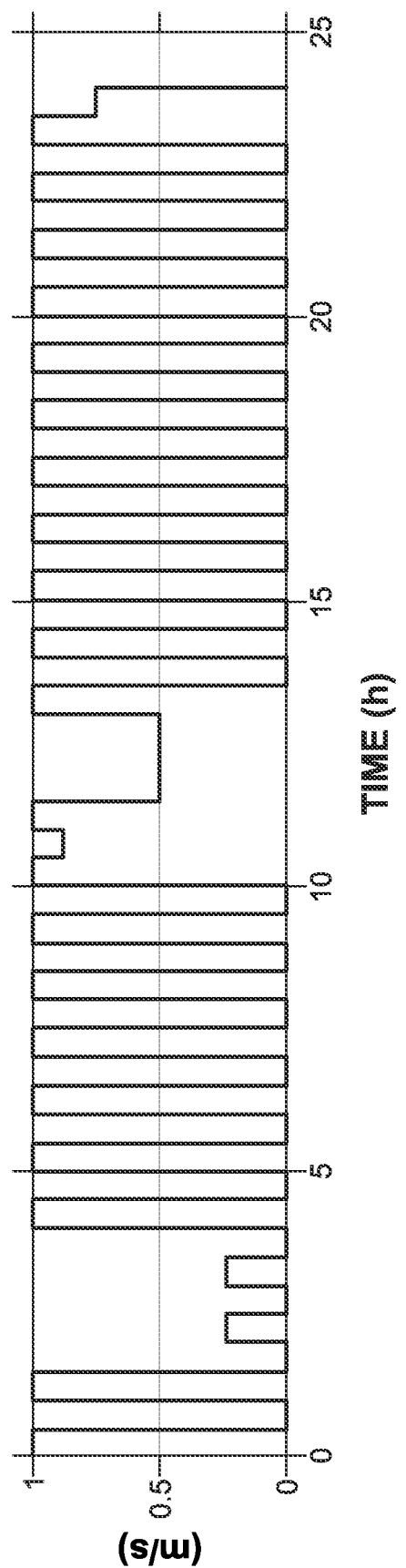
FIG. 6B illustrates the feed flow velocity versus time for the same system, and FIG. 6C the solar intensity for the period for which the feed tank temperature is measured.
Figure 6C:
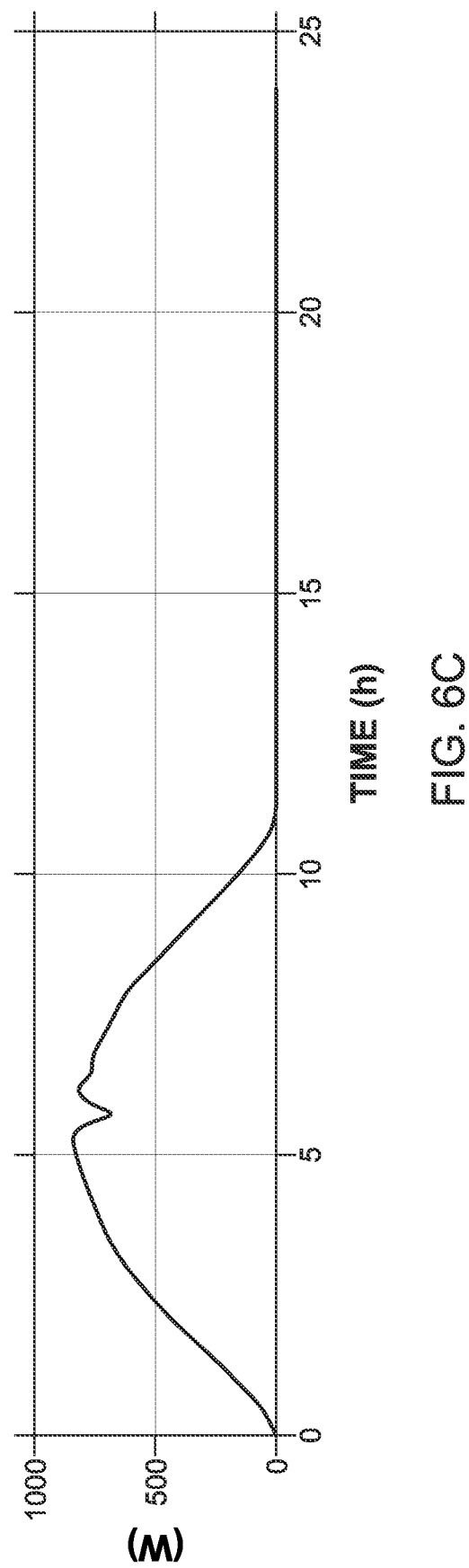

FIG. 6A illustrates the feed tank's temperature over one full day, FIG. 6B illustrates the flow velocity of the feed water applied with the feed pump 120 over the full day, and FIG. 6C illustrates the solar intensity experienced by the solar collector system 114 during the considered one full day. It is observed in FIG. 5A that the overall control signal profile 500 appears to have two modes, a day time mode 502 and a night time mode 504. It is noted that these two profiles are obtained after performing calculations in the controller based on the MPC model. However, as discussed in the Background section, one factor why the MD systems are not widely implemented is because of various complications introduced by the existing controllers, which rely on different models for modeling the parameters of the system, which are not always reliable and/or accurate.

The inventors have discovered that it is possible to simplify the existing controllers by implementing a model-free control scheme for the day time, and a greedy control or another control for the night time. In one application, the model-free control scheme for the day time is a bang-bang controller. A bang-bang controller switches on and off between specific values, as discussed later. The day time control, from 0 h to 10 h, is configured to keep the tank temperature high by turning on and off the feed flow to the DCMD module and allowing the feed tank to recharge, i.e., allowing the feed tank temperature to increase by accumulating the thermal energy from the solar collector system. Note that the bang-bang controller would be implemented to control the feed pump 120 to start and stop the feed flow to the DCMD module 160.

However, overnight, from 10 h-14 h, there is no solar input and hence the optimal control flow velocity is maintained at a high value to drain the remaining energy in the feed tank. After 14 h, the feed's temperature in the feed tank has become the same as the permeate's temperature on the permeate heat exchange part, and the control of the flow velocity generated by the controller is insignificant until the next day.

Figure 7:
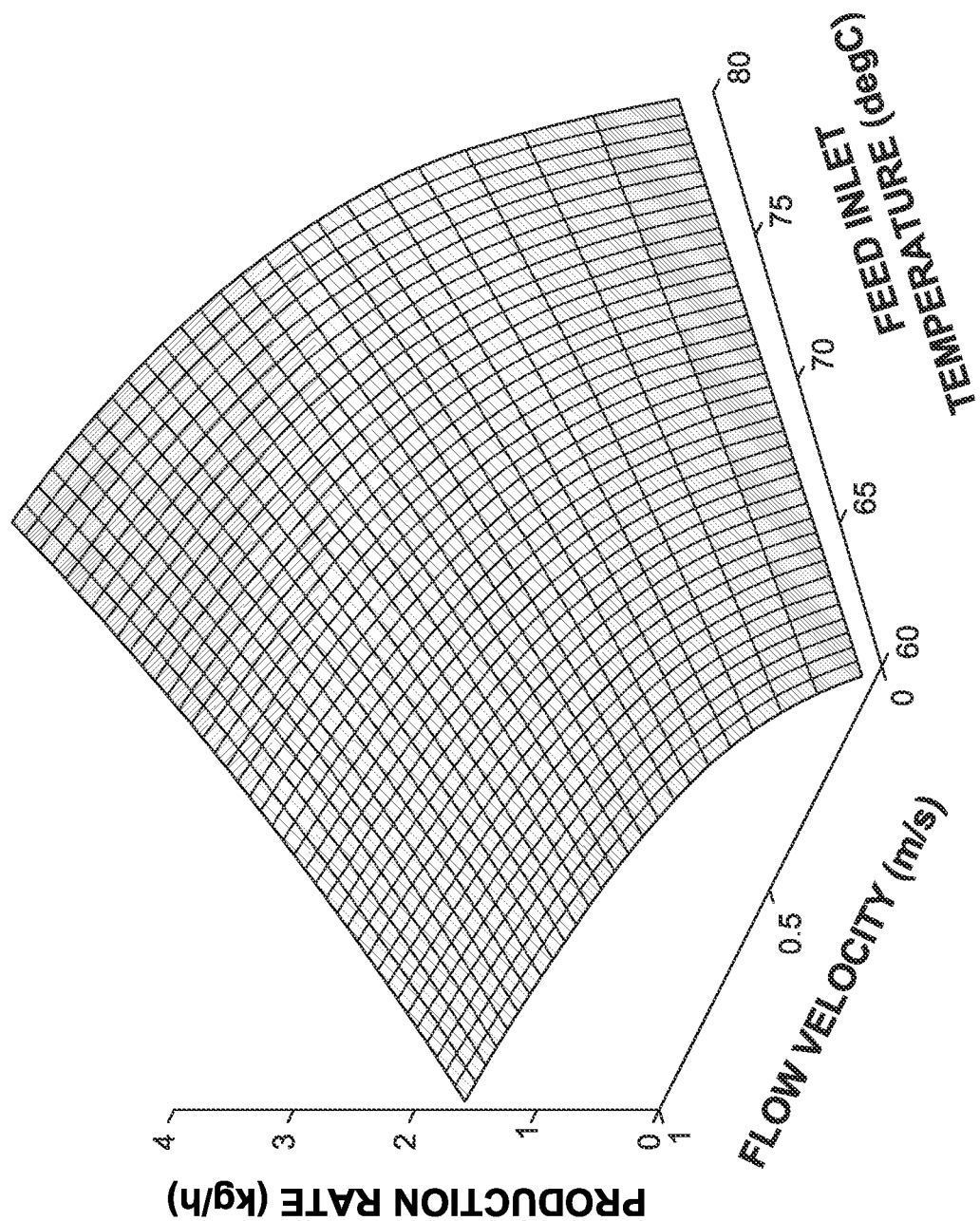
FIG. 7 illustrates the dependency of the fresh water production rate with the flow velocity and the feed inlet temperature.

This strategy for the MD system's controller is explained based on FIG. 7, which shows the correlation between the fresh water production rate, the feed flow velocity, and the feed inlet temperature. It is noted that the production rate of the DCMD module 160 is increasing with both the feed flow velocity and the feed inlet temperature. Note that it is assumed that the permeate inlet temperature is constant at 20° C., and equal to the permeate and feed flow rates. Because the production rate is exponentially increasing with the feed inlet temperature, as shown in FIG. 7, the loss of production during the feed tank recharge time is compensated by a higher production rate of the DCMD module during the active duty-cycle at a higher temperature. This nonlinearity is the underlying reason for the novel model-free controller to be applied to an MD system, which is now discussed.

According to an embodiment, the bang-bang control alternates between fixed controller setpoints based on triggers in the system's state. A bang-bang controller in [6] used a quick charging mode when the temperature dropped below 60° C. However, in this embodiment, the bi-modal controller is always bang-bang during daylight hours, and changes to a conventional greedy controller during the night-time. The novel bang-bang controller has the advantage that it is simple to implement and still provides near-optimal production. In fact, no modelling or optimization is needed for the controller during the day time.

Figure 8:
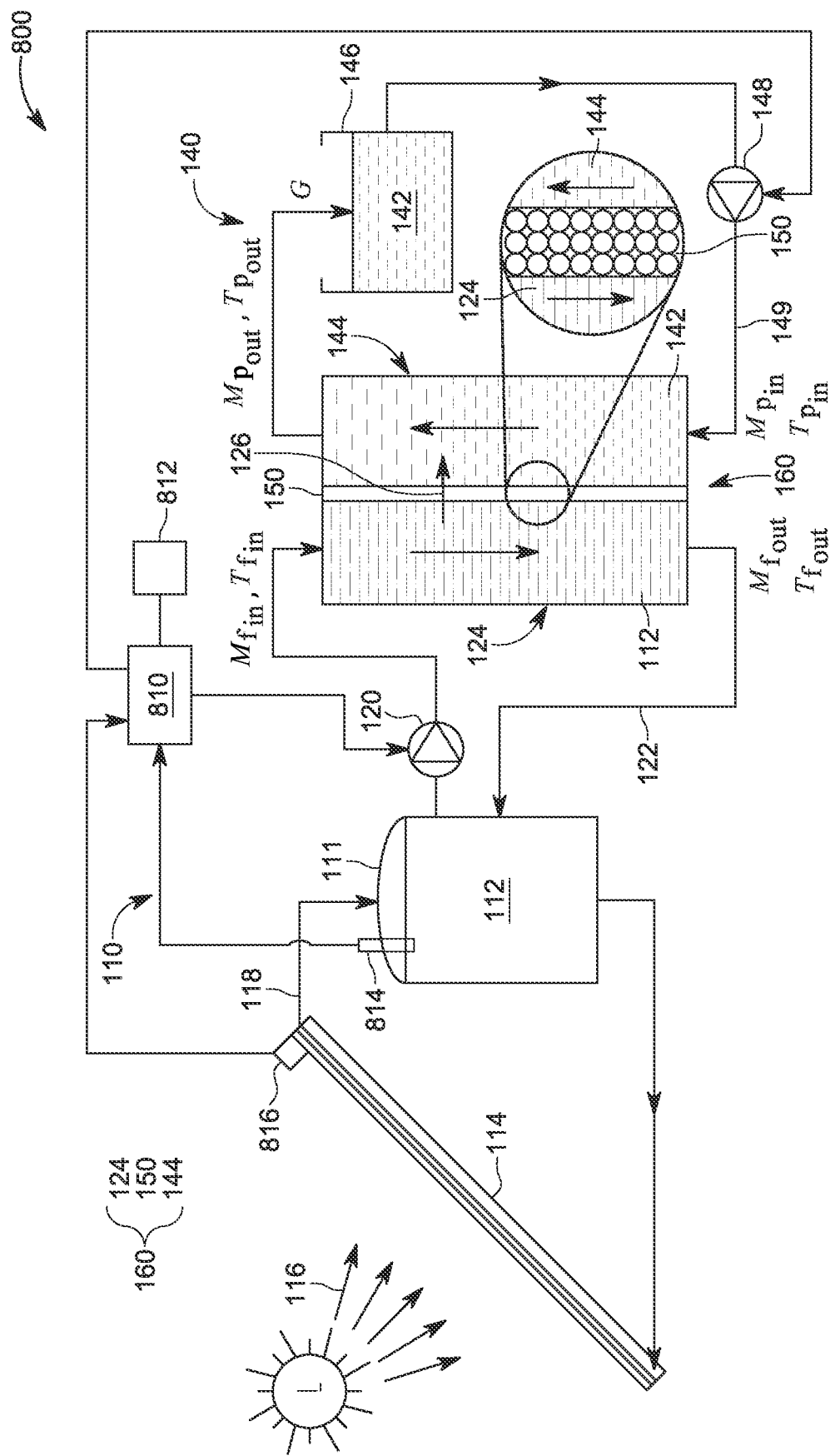
FIG. 8 illustrates an MD system having a controller that implements a model-free control scheme during a day time.

It is possible to select the setpoints of the bang-bang controller to be either in the time domain or in the temperature domain. The two domains are investigated separately. FIG. 8 illustrates an MD system 800, which is similar to the MD system 100, except for a controller 810 that is configured to control the feed pump 120. According to a first embodiment, the controller 810 is implemented as a time-based bang-bang controller for the day time (first control mode). For this reason, controller 810 is connected to or includes a time setting device 812. The time setting device 812 may be a GPS receiver, a quartz oscillator, or other known devices that keep the time.

Figure 9A:
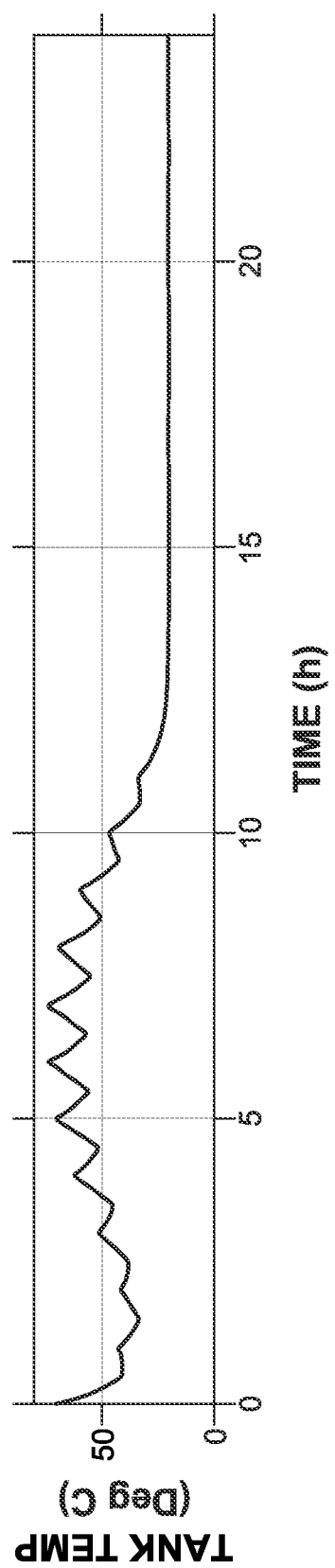
FIG. 9A illustrates the feed tank temperature over time for the MD system with the model-free controller.
Figure 9B:
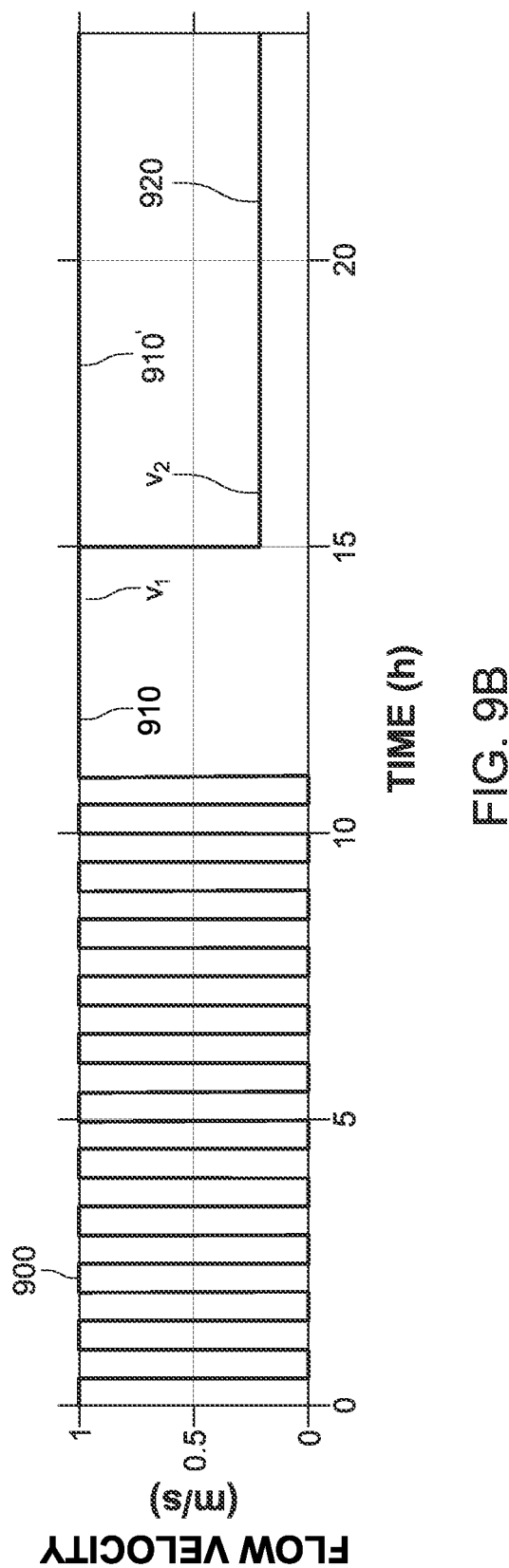
FIG. 9B illustrates the feed flow velocity in the system.

The controller 810 (a structure of which is discussed in more detail later with regard to FIG. 19) is programmed to turn on and off the feed pump 120, according to a first control mode 900, which is represented as a signal that is shaped to be a square wave, which is illustrated in FIG. 9B. The square wave signal 900 is selected in this embodiment to have a 50% duty cycle, i.e., the signal is on for half the period and off for the other half of the period. Other values for the duty cycle may be used. The square wave signal 900 is applied to the feed pump 120 only during the day time. The signal 900 corresponds to the flow velocity of the feed through the DCMD module 160, due to the feed pump 120. The day time is judged by the controller 810 based on the clock 812. When night time is detected by the controller 810, it switches from the first control mode 900 to a second control mode 910, 910'.

The second control mode 910, 910' may be, in one embodiment, the greedy control scheme (as discussed above). In another embodiment, the controller 810 implements two control modes for the night time. For example, a second control mode 910 is implemented (which is stored in a memory associated with the controller) to run the feed pump continuously, with a constant first flow speed v1 for a first part of the night (for example, the first four hours of the night as shown in FIG. 9B) and then a third control mode 920 is implemented, which stops the feed pump or runs it with a second flow speed v2, continuously, for the second part of the night. The first flow speed is larger than the second flow speed. The greed control scheme for the night time only may be as illustrated in FIG. 6B.

FIG. 9A illustrates the temperature of the feed 112 in the feed tank 111, which may be measured with a temperature sensor 814, located in the feed tank. The temperature sensor may be configured to be in communication (wired or wireless) with the controller 810. The solar intensity experienced during one day by the solar collection system 114 is illustrated in FIG. 9C.

Figure 10A:
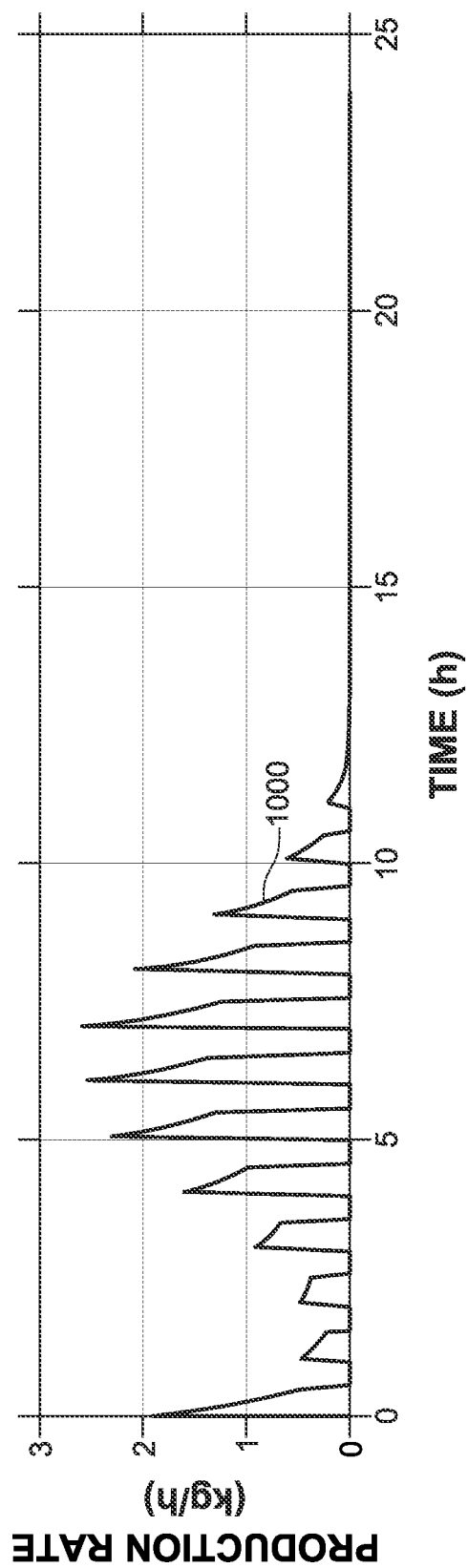
FIG. 10A illustrates the fresh water production rate of the MD system controlled with the model-free controller and FIG. 10B illustrates the fresh water production for the same system.
Figure 10B:
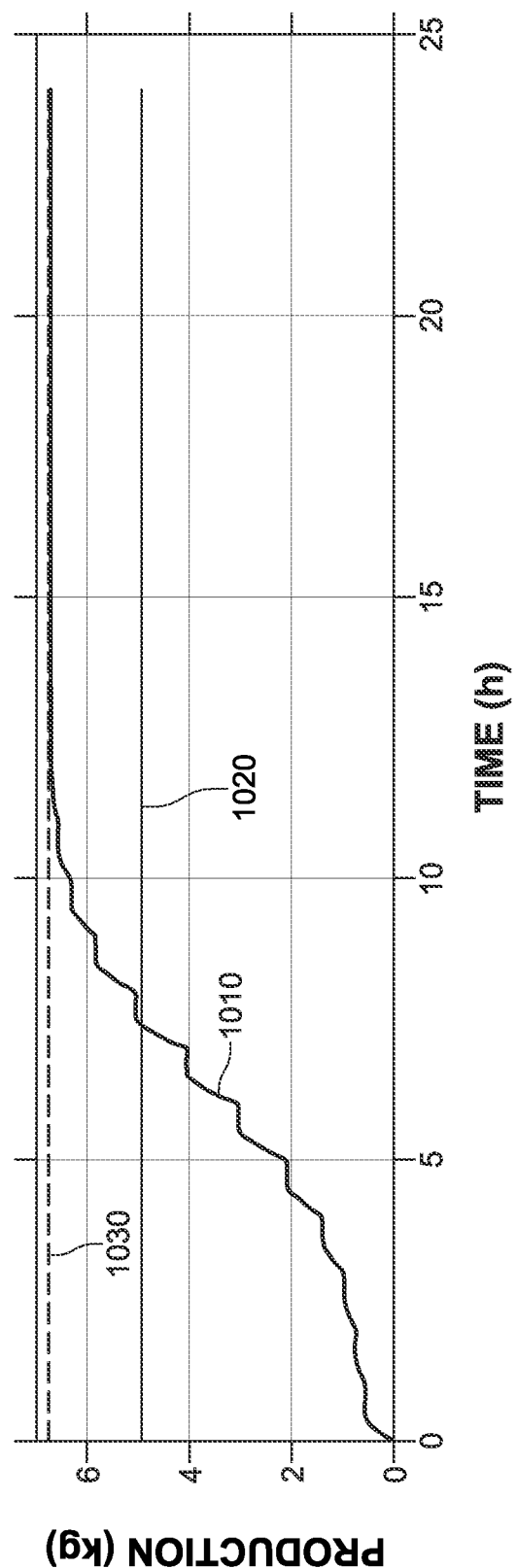

FIG. 10A shows the fresh water production rate 1000 versus time and FIG. 10B shows the production amount 1010 versus time when the new controller is used. FIG. 10B also shows, for comparison purposes, the traditional production 1020 obtained with a greedy controller and the production 1030 obtained with an MPC optimized controller. Note that the new control strategy that uses a model-free bang-bang controller becomes comparable to the MPC optimized production after a couple of hours.

Figure 11:
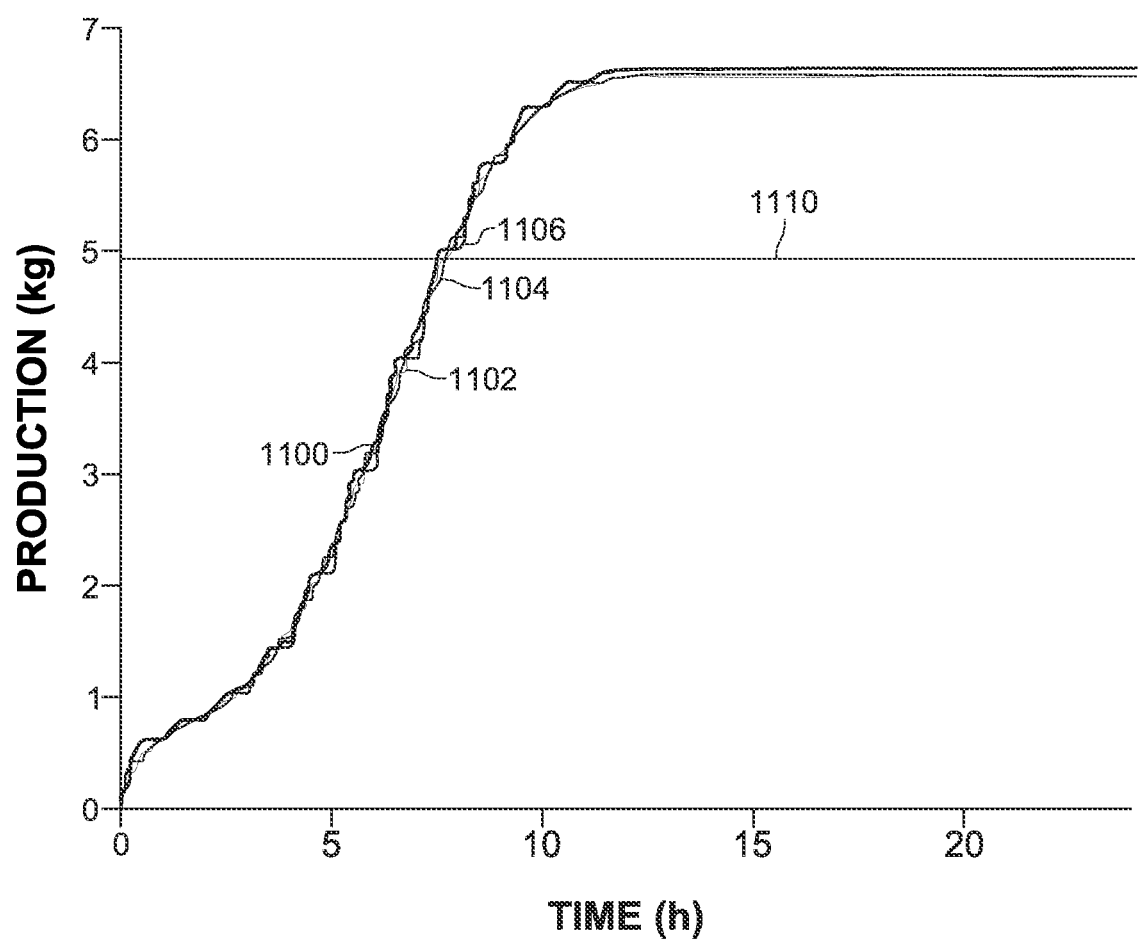
FIG. 11 illustrates the fresh water production versus time for various periods of a control signal generated by the model-free controller.

FIG. 11 illustrates the fresh water productions 1102, 1104, 1106, and 1108 obtained in the MD system 800, when equipped with the novel controller 810, as the length of the duty cycle is changed from 10 to 20 to 30 and to 60 minutes, respectively. FIG. 11 also shows the production 1110 obtained with the traditional greedy controller. It is noted from this figure that the fresh water production remains essentially constant when the duty cycle of the controller 810 is increased from 10 minutes to 60 minutes, which indicates that a longer duty cycle may be implemented to avoid the wear and tear on the feed pump due to the otherwise rapid turn between the on and off states.

Figure 12:
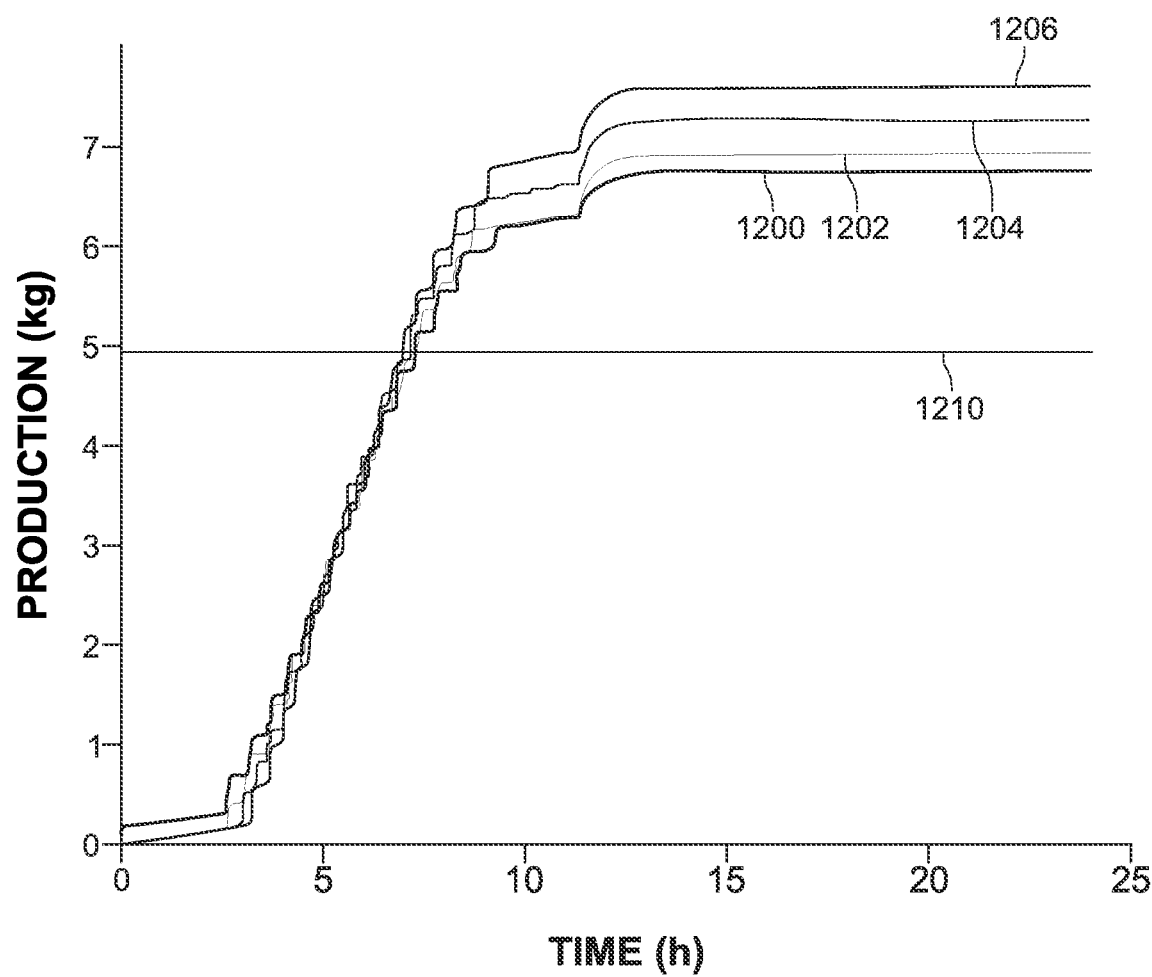
FIG. 12 illustrates the fresh water production versus time for various temperature ranges of a control signal generated by the model-free controller.

In another embodiment, the novel controller 810 is implemented to turn on and off the feed pump not based on a given time, but rather on a given temperature of the feed during the day. As previously discussed, FIG. 8 shows the controller 810 connected to a temperature probe 814 that is measuring the temperature of the feed 112 inside the feed tank 111. In addition, the controller 810 is also connected to a solar intensity sensor 816, which is configured to measure the solar intensity received by the solar collector system 114. For this implementation, the controller 810 is configured to switch on and off the feed flow velocity (by controlling the pump 120) and the fresh water flow velocity (by controlling the pump 148), based on a threshold feed tank temperature value (which is also the feed inlet temperature) and/or the measured solar intensity. To determine which low and high temperatures to select for the bang-bang control scheme, the inventors have explored, as shown in FIG. 12, the effect of the upper and lower feed tank temperature thresholds on the fresh water production of the MD system 100 for an average day (the same day as plotted in FIG. 9C). It is noted that after about 7 hours, all the tested combinations of low and high temperatures 1200 to 1206 perform better than the fresh water production 1210 obtained by using the greed control. The curve 1200 corresponds to a low temperature of 65° C. and a high temperature of 70° C., the curve 1202 corresponds to a low temperature of 70° C. and a high temperature of 75° C., curve 1204 corresponds to a low temperature of 75° C. and high temperature of 80° C., and curve 1206 corresponds to a low temperature of 80° C. and a high temperature of 85° C. It is noted that the higher the low and high temperatures, the better is the fresh water production. Thus, according to this embodiment, the objective of the controller is to keep the feed tank's temperature high in order to most effectively use the daily solar energy generated by the solar collector system 114, during the day time. As previously discussed, during the night time, either a limited control (e.g., the feed pump operates continuously at a low speed or is completely stopped, as illustrated in FIG. 9B) is implemented or a greedy control is used.

Figure 13A:
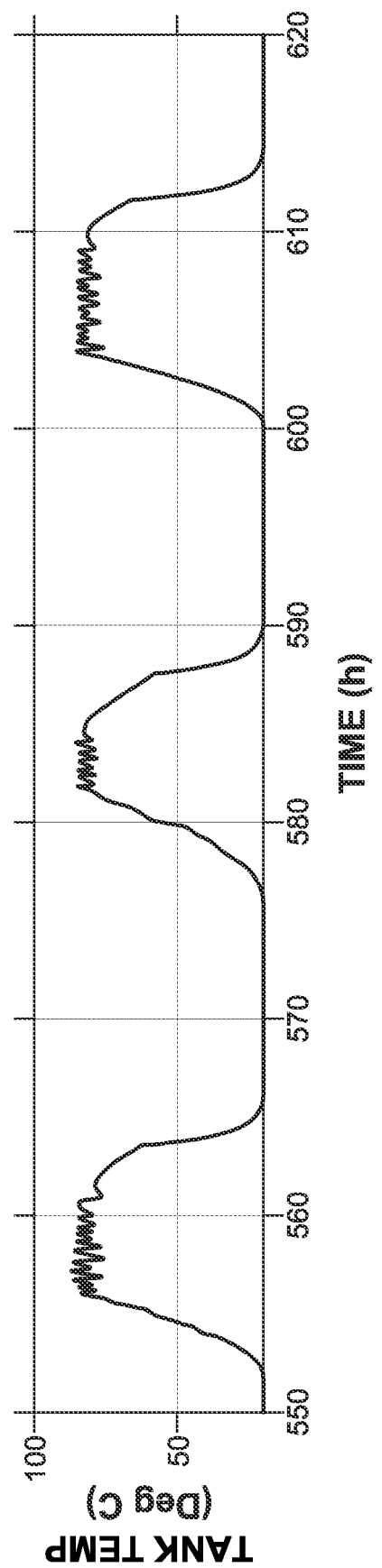
FIG. 13A illustrates the feed tank temperature over a period of one month for the MD system with the model-free controller.
Figure 13B:
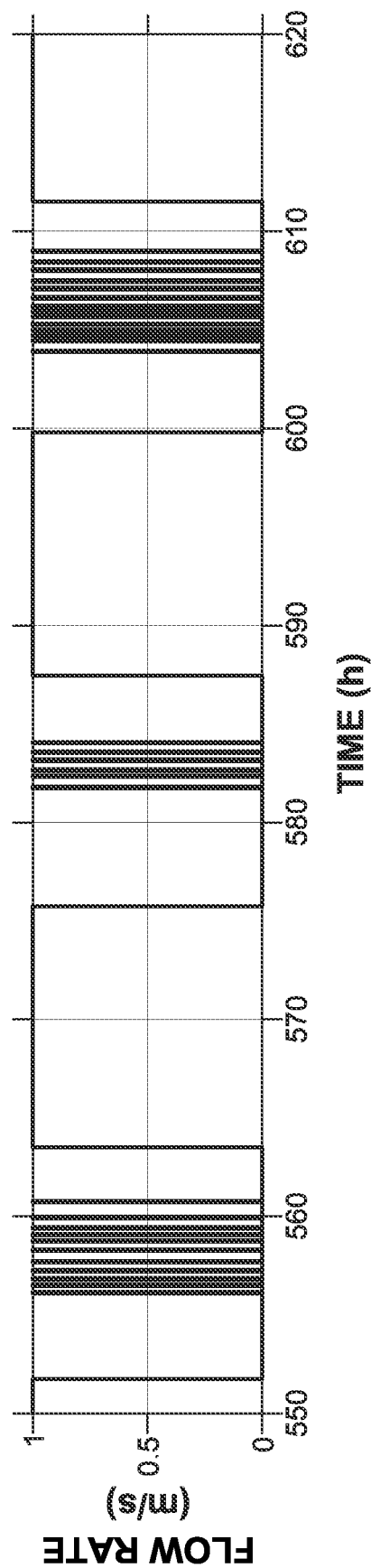
FIG. 13B illustrates the feed flow velocity in the system during that month.
Figure 13C:
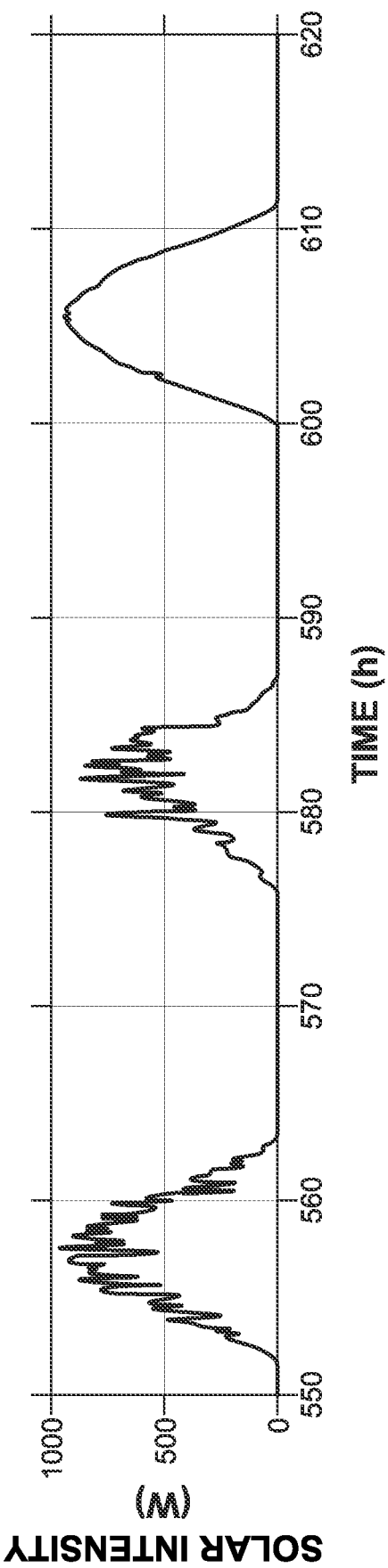
FIG. 13C illustrates the solar intensity experienced by the system for the observed period of time.
Figure 14:
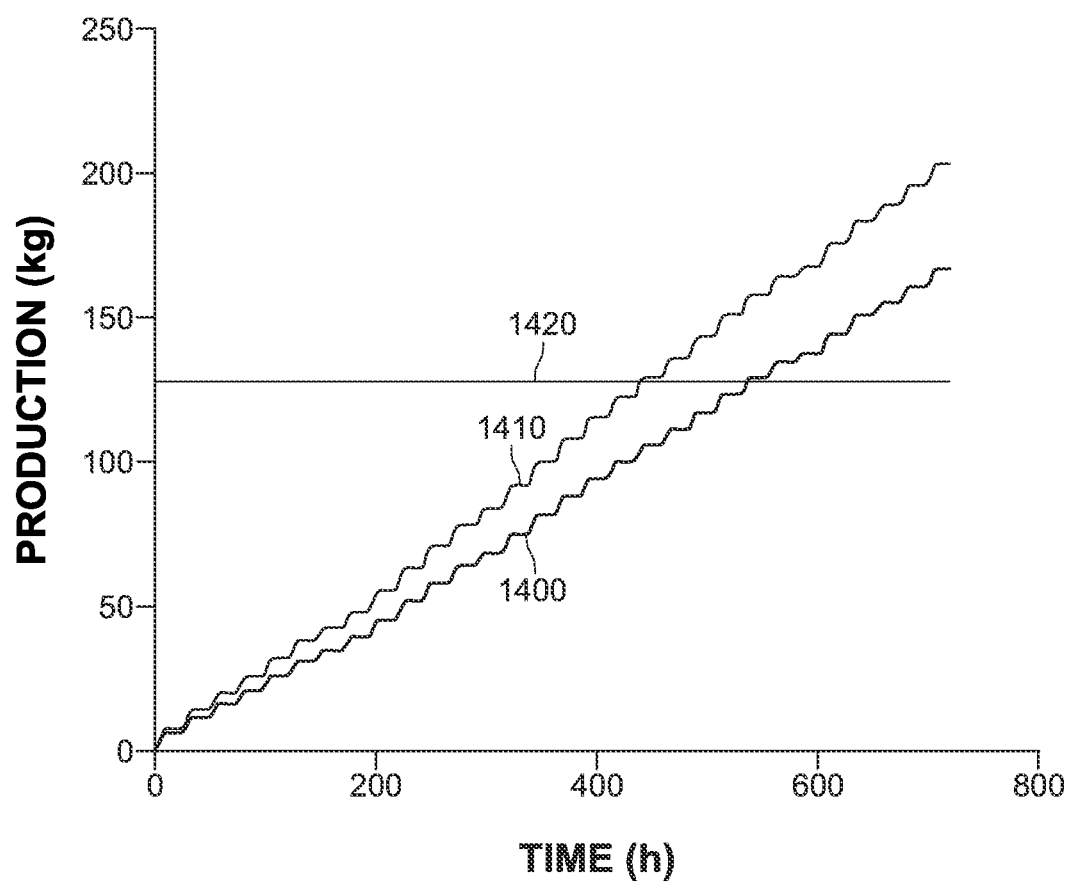
FIG. 14 illustrates the fresh water production over the one month for the MD system when equipped with the greed controller, the time-based bang-bang controller, and the temperature-based bang-bang controller.

The control strategy discussed above has been applied to various cases for testing the efficiency of this new approach. In a first application, a greedy control scheme and the novel bang-bang control scheme during the day time have been applied to an MD system for a month. Real weather data has been collected for Jeddah, Saudi Arabia, for the month of February of 2002. The solar intensity during the month has a mixture of clear sunny days and cloudy days, as shown in FIG. 13C. The temperature threshold bang-bang control has a lower setpoint of 80° C. and an upper setpoint of 85° C., as illustrated in FIG. 13A, which shows the feed tank temperature over the selected one month. The flow velocity of the feed generated by the feed pump 120 in the MD system 100 is shown in FIG. 13B. Note that the flow velocity is the parameter that is controlled by the bang-bang controller 810. The time period for the bang-bang signal was selected to be 60 minutes and the duty cycle of the signal has been selected to be 50%. The fresh water production 1400 for the temperature-based bang-bang control, the fresh water production 1410 for the time-based bang-bang control, and the fresh water production 1420 for the greedy control are plotted in FIG. 14. The temperature-based bang-bang control and the time-based bang-bang control show 59% and 30% improved production during the month, when compared to the greedy control. It is noted that the temperature-based bang-bang controller achieves superior performance in the case where it is able to maintain the high tank temperature.

Figure 16A:
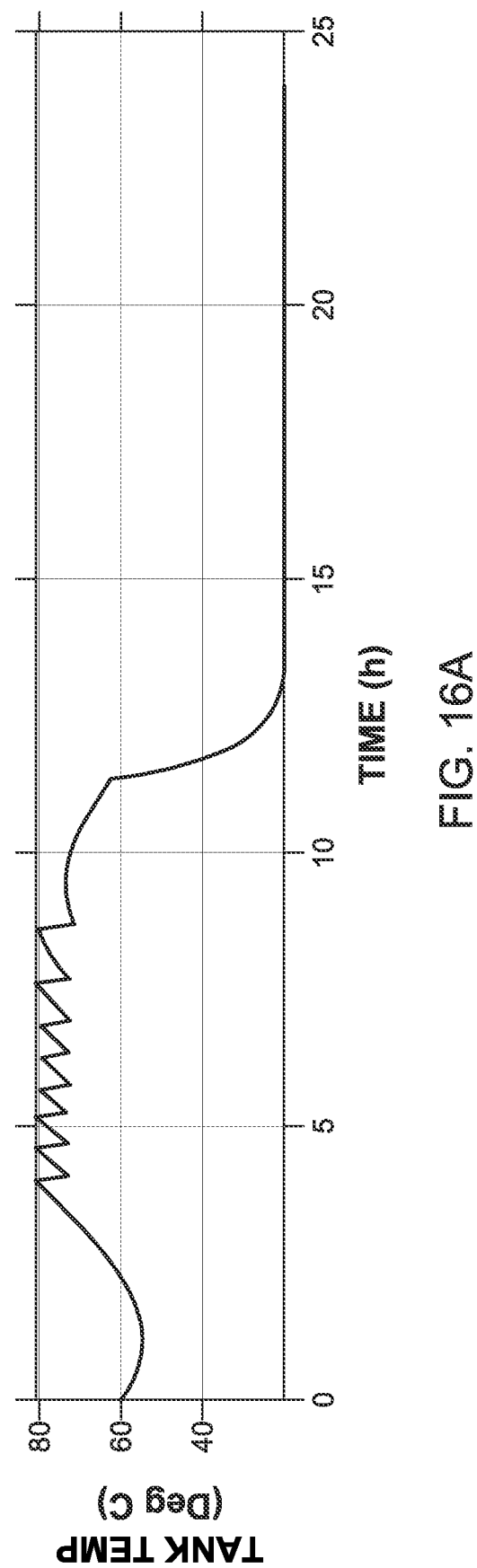
FIG. 16A illustrates the feed tank temperature over a period of one day for the scaled-up MD system with the model-free controller.
Figure 16B:
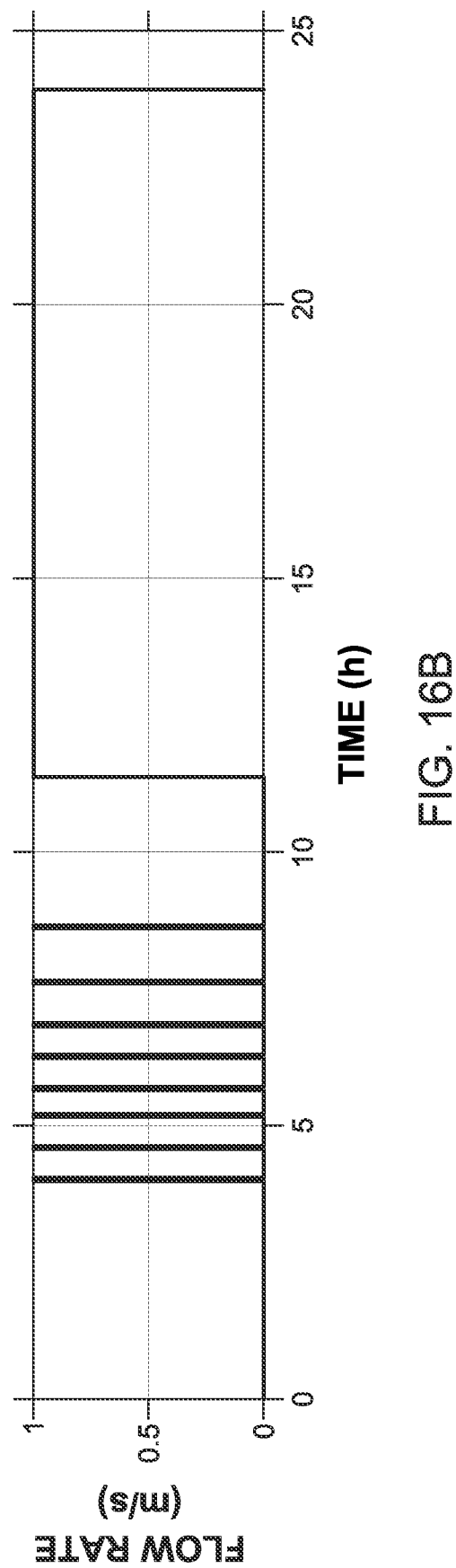
FIG. 16B illustrates the feed flow velocity in the system during the one day.
Figure 16C:
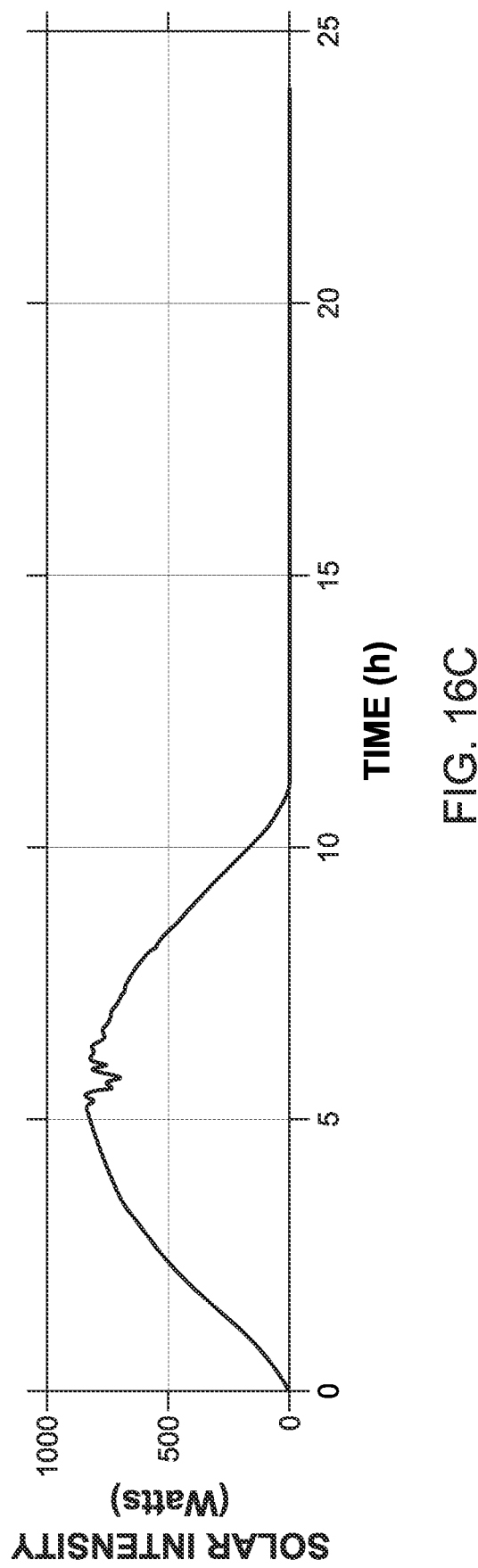
FIG. 16C illustrates the solar intensity experienced by the system for the observed period of time.
Figure 17:
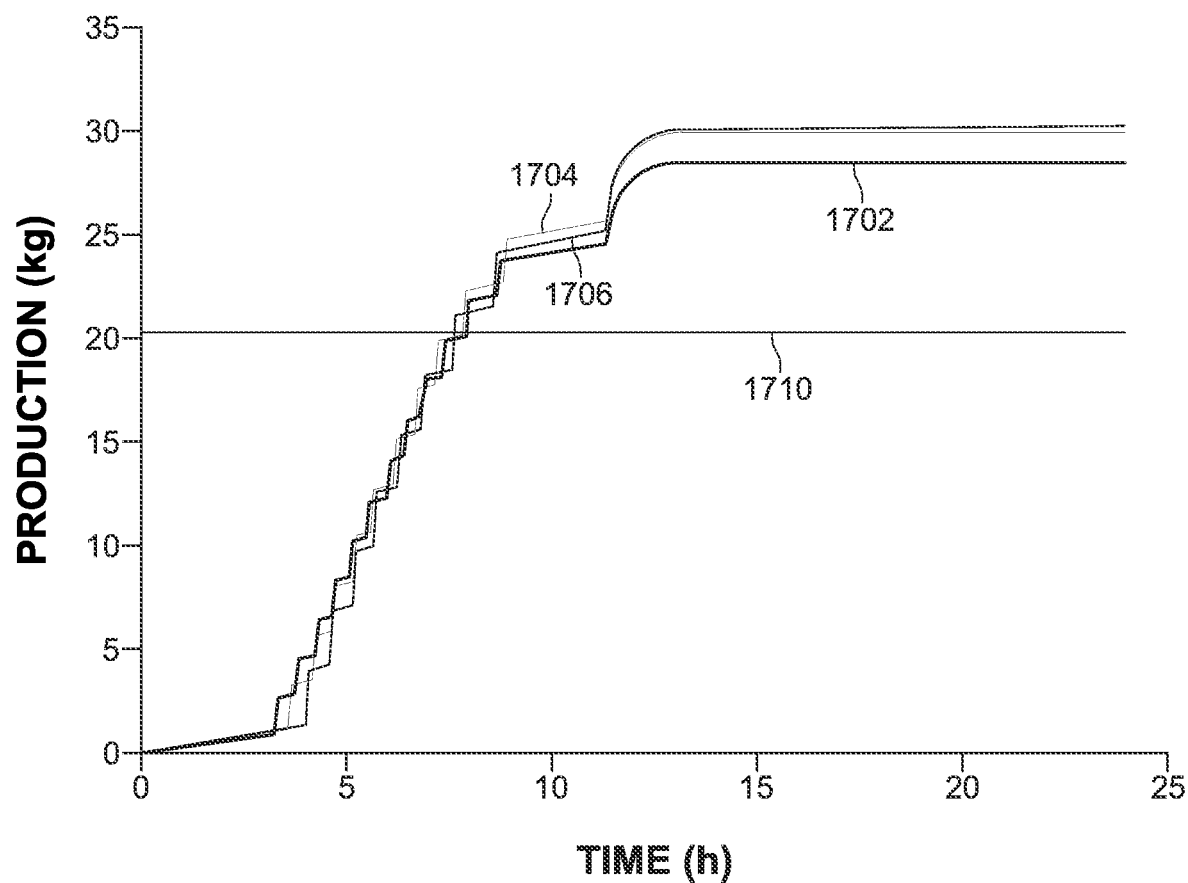
FIG. 17 illustrates the fresh water production of the MD system equipped with the model-free controller for various temperature set points of the feed.

In a second application, the novel model-free bang-bang controller has been implemented for a scaled-up system. In this regard, the dimensions of the MD system 100 used for the previous measurements are summarized in Table I in FIG. 15A. Table II in FIG. 15B shows the features of the scaled-up MD system. it is noted that a volume of the scaled-up MD system is doubled. FIGS. 16A to 16C shows the feed tank's temperature, the flow velocity of the feed through the DCMD module 160, and the solar intensity at the solar collector system 114 for the scaled-up system. The lower and upper temperature setpoints for the bang-bang controller during the day time were selected to be 75° C. and 80° C., respectively. FIG. 17 plots the fresh water production of the scaled-up system for various temperature set points for the bang-bang controller. Curve 1702 is the fresh water production when the low temperature at which the feed pump is turned off is 65° C. and the high temperature at which the feed pump is turned on is 70° C., curve 1704 shows the production for the low temperature of 70° C. and the high temperature of 75° C., and curve 1706 shows the production for the low temperature of 75° C. and the high temperature of 80° C. Curve 1710 shows the production for the greed control. Note that increasing the temperature threshold range beyond 75° C. does not offer much increase in the fresh water production. This is due to the larger module size dissipating the stored energy via conduction at a faster rate through the larger surface area of the membrane while the controller is trying to charge the feed tank. This trade-off between the size of the feed tank and the amount of energy lost by the tank limits the performance of the controller under certain scales. To minimize this effect, the solar collector system could be expanded to increase the thermal input and allow the bang-bang controller to operate at higher temperatures, but there would still be inherent thermal loss across the membrane. It is therefore suggested that the system's dimensions—especially the feed tank volume, solar collector system size, and the DCMD module dimensions—are further tuned such that the bang-bang controller operates efficiently. Nevertheless, even without tuning the MD system's dimensions, the bang-bang controller gives a 50% increase in the fresh water production over 24 h compared to the greedy control.

Figure 18:
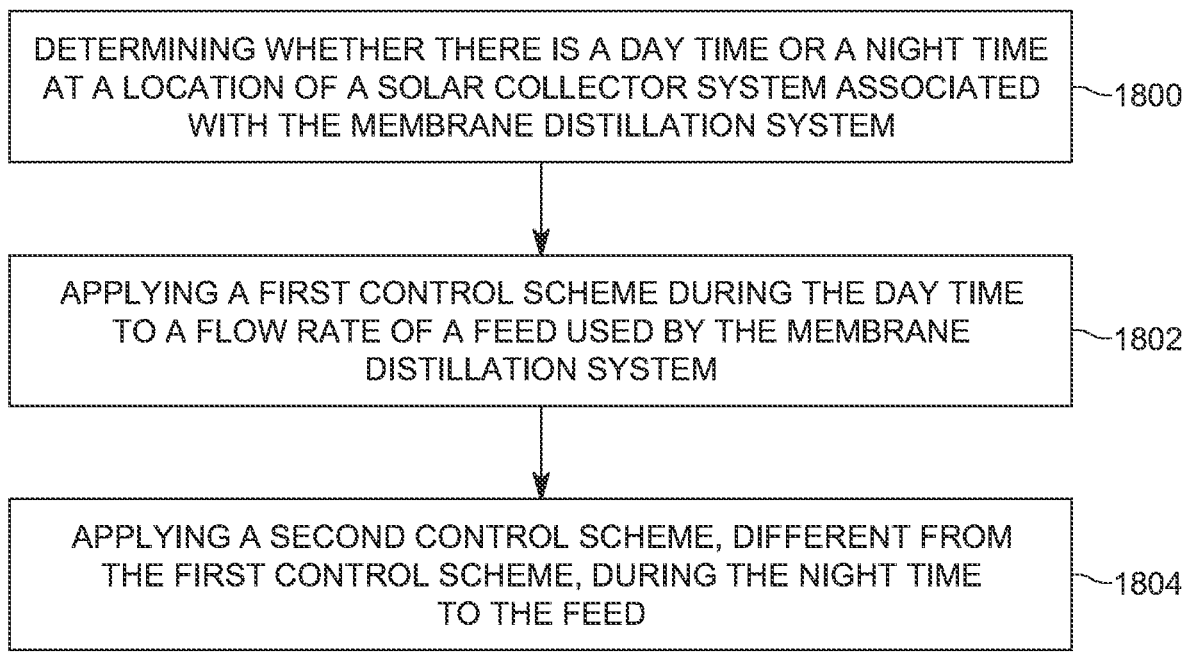
FIG. 18 is flowchart of a method for generating fresh water with an MD system that uses a model-free controller.

A method for controlling a membrane distillation system is illustrated in FIG. 18. The method includes a step 1800 of determining whether there is a day time or a night time at a location of a solar collector system associated with the membrane distillation system, a step 1802 of applying a first control scheme during the day time to a flow velocity of a feed used by the membrane distillation system, and a step 1804 of applying a second control scheme, different from the first control scheme, during the night time to the feed. The first control scheme is a model-free scheme. In one application, the model-free scheme is implemented into a bang-bang controller of the membrane distillation system.

The method may further include a step of turning on a feed pump of the membrane distillation system when an actual temperature of the feed is above a first set temperature, and a step of turning off the feed pump of the membrane distillation system when the actual temperature of the feed is below a second set temperature, where the first set temperature is higher than the second set temperature. In one application, the bang-bang controller generates a step signal that turns on and off the feed pump and/or the duty cycle of the step signal is 50%. The method may further include measuring the actual temperature of the feed at a feed tank that holds the feed. In still another application, the second control scheme is a greedy control or a constant flow velocity of the feed. The method may also include heating the feed with solar energy captured by a solar collector system, and sending water vapor from the feed, through a distillation membrane, to generate fresh water.

Figure 19:
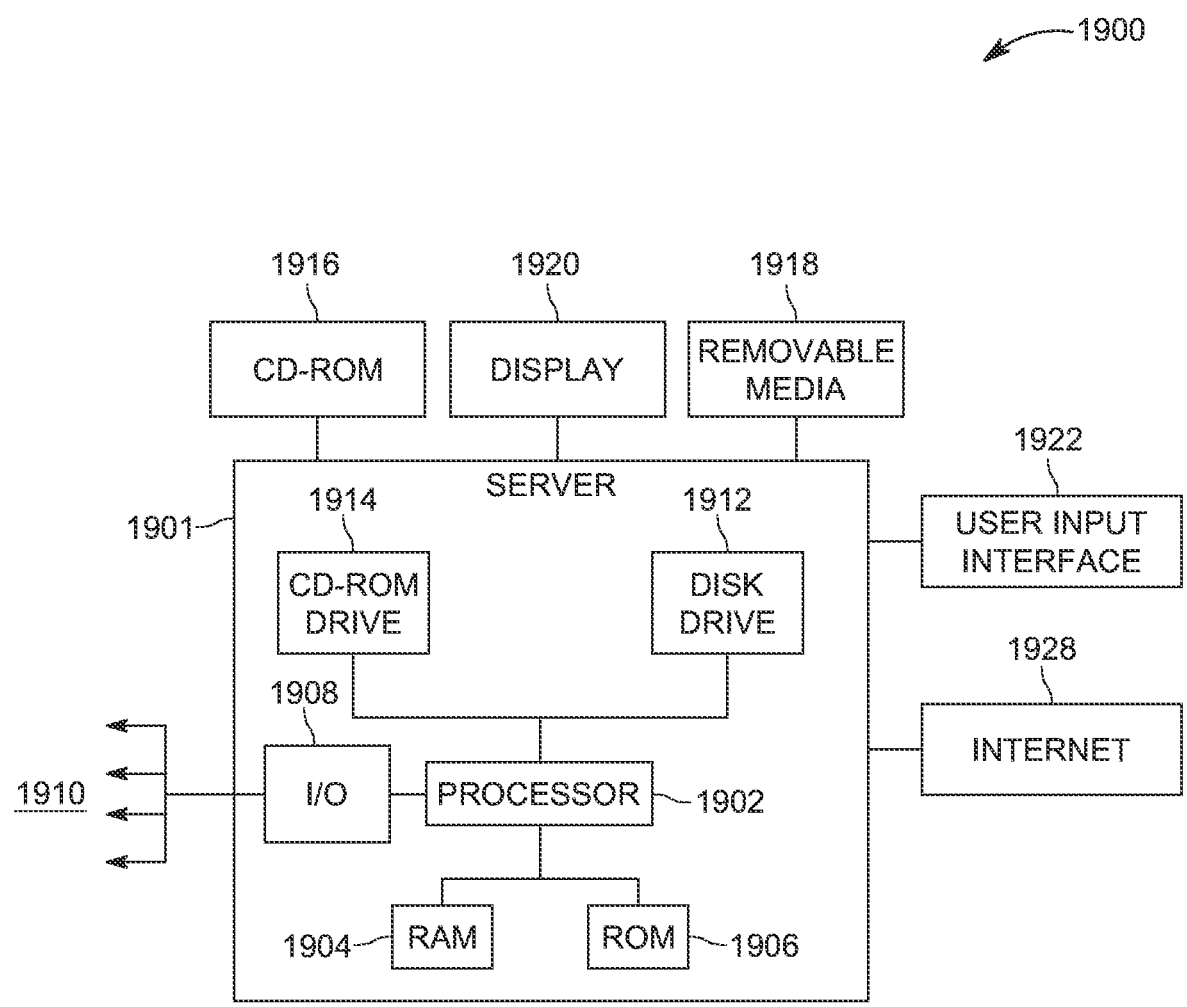
FIG. 19 is a schematic diagram of the configuration of the model-free controller.

The above-discussed procedures and methods may be implemented in a controller 1900 as illustrated in FIG. 19. Hardware, firmware, software or a combination thereof may be used to perform the various steps and operations described herein. Controller 1900 (which corresponds to controller 810 in FIG. 8) suitable for performing the activities described in the exemplary embodiments may include a server 1901. Such a server 1901 may include a central processor (CPU) 1902 coupled to a random access memory (RAM) 1904 and to a read-only memory (ROM) 1906. ROM 1906 may also be other types of storage media to store programs, such as programmable ROM (PROM), erasable PROM (EPROM), etc. Processor 1902 may communicate with other internal and external components through input/output (I/O) circuitry 1908 and bussing 1910 to provide control signals and the like. Processor 1902 carries out a variety of functions as are known in the art, as dictated by software and/or firmware instructions.

Server 1901 may also include one or more data storage devices, including hard drives 1912, CD-ROM drives 1914 and other hardware capable of reading and/or storing information, such as DVD, etc. In one embodiment, software for carrying out the above-discussed steps may be stored and distributed on a CD-ROM or DVD 1916, a USB storage device 1918 or other form of media capable of portably storing information. These storage media may be inserted into, and read by, devices such as CD-ROM drive 1914, disk drive 1912, etc. Server 1901 may be coupled to a display 1920, which may be any type of known display or presentation screen, such as LCD, plasma display, cathode ray tube (CRT), etc. A user input interface 1922 is provided, including one or more user interface mechanisms such as a mouse, keyboard, microphone, touchpad, touch screen, voice-recognition system, etc.

Server 1901 may be coupled to other devices, such as temperature probes, pumps, flow velocity measuring devices, etc. The server may be part of a larger network configuration as in a global area network (GAN) such as the Internet 1928, which allows ultimate connection to various landline and/or mobile computing devices.

The disclosed embodiments provide a multi-mode controller that is configured to implement a bang-bang control mode during the day time and another control mode during the night time for a membrane distillation system. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] F. Eleiwi, T. M. Laleg-Kirati, Nonlinear observer-based Lyapunov boundary control of distributed heat transfer mechanisms for membrane distillation plant, Journal of Process Control 47 (2016) 78-86.
[2] H. Chang, G.-B. Wang, Y.-H. Chen, C.-C. Li, C.-L. Chang, Modeling and optimization of a solar driven membrane distillation desalination system, Renewable Energy 35 (12) (2010) 2714-2722.
[3] A. Karam, T. Laleg-Kirati, Electrical thermal networks for direct contact membrane distillation modeling, in: Control Applications (CCA), 2014 IEEE Conference on, 2014, pp. 1563-1569.
[4] F. Eleiwi, T. M. Laleg-Kirati, Observer-based perturbation extremum seeking control with input constraints for direct-contact membrane distillation process, International Journal of Control 91 (6)(2018) 1363-1375.
[5] R. Porrazzo, A. Cipollina, M. Galluzzo, G. Micale, A neural network-based optimizing control system for a seawater-desalination solar-powered membrane distillation unit, Computers and Chemical Engineering 54 (0) (2013) 79-96.
[6] J. D. Gil, L. Roca, A. Ruiz-Aguirre, G. Zaragoza, M. Berenguel, Optimal operation of a solar membrane distillation pilot plant via nonlinear model predictive control, Computers and Chemical Engineering 109 (2018) 151-165. doi:https://doi.org/10.1016/j.compchemeng.2017.11.012. URL http://www.sciencedirect.com/science/article/pii/S0098135417304131
[7] A. M. Karam, T. M. Laleg-Kirati, Electrical equivalent thermal network for direct contact membrane distillation modeling and analysis, Journal of Process Control 47 (2016) 87-97.
[8] A. M. Karam, A. S. Alsaadi, N. Ghaffour, T. M. Laleg-Kirati, Analysis of direct contact membrane distillation based on a lumped-parameter dynamic predictive model, Desalination 402 (2017) 50-60.

What is claimed is:

1. A method for controlling a membrane distillation system over a day time and a night time, the method comprising:
    determining, with a controller, whether there is the day time or the night time at a location of a solar collector system associated with the membrane distillation system;
    applying a first control mode during the day time to a flow velocity of a feed used by the membrane distillation system; and
    applying a second control mode, different from the first control mode, during the night time, to the feed,
    wherein the first control mode is a model-free mode, which is configured to start and stop the feed used by the membrane distillation system, to keep a temperature of the feed in a feed tank within a threshold defined by a first set temperature and a second set temperature, for maximizing a daily fresh water production of the membrane distillation system.

2. The method of claim 1, wherein the model-free mode is implemented into the controller such that the controller operates as a bang-bang controller of the membrane distillation system.

3. The method of claim 2, further comprising:
    turning on a feed pump of the membrane distillation system when an actual temperature of the feed is above the first set temperature; and
    turning off the feed pump of the membrane distillation system when the actual temperature of the feed is below the second set temperature,
    wherein the first set temperature is higher than the second set temperature.

4. The method of claim 3, wherein the bang-bang controller generates a step signal that turns on and off the feed pump.

5. The method of claim 4, wherein a duty cycle of the step signal is 50% of a time period of the step signal.

6. The method of claim 3, further comprising: measuring the actual temperature of the feed at the feed tank that holds the feed.

7. The method of claim 1, wherein the second control mode is a greedy control mode.

8. The method of claim 1, wherein the second control mode controls a feed pump to maintain a constant and maximum flow velocity of the feed during a first part of the night time.

9. The method of claim 1, further comprising: heating the feed with solar energy captured by the solar collector system; and sending water vapor from the feed, through a distillation membrane of the membrane distillation system, to generate the fresh water.

10. A membrane distillation system comprising:
    a solar collector system configured to collect solar energy and supply heat;
    a feed tank configured to hold a feed that is heated by the heat from the solar collector system;
    a membrane that is configured to receive the feed on one side and allow only water vapor to pass through the membrane on the other side to generate fresh water;
    a feed pump configured to circulate the feed with a flow velocity, from the feed tank to the membrane and back; and
    a controller configured to control the feed pump by applying a first control mode during a day time, to the flow velocity of the feed, and by applying a second control mode during a night time, different from the first control mode, to the flow velocity of the feed,
    wherein the first control mode is a model-free mode, which is configured to start and stop the feed used by the membrane distillation system, to keep a temperature of the feed in the feed tank within a threshold defined by a first set temperature and a second set temperature, for maximizing a daily fresh water production of the membrane distillation system.

11. The system of claim 10, wherein the controller is configured to receive information about whether there is the day time or the night time at a location of the solar collector system.

12. The system of claim 10, wherein the model-free mode is implemented as a bang-bang control of the controller.

13. The system of claim 10, wherein the controller is configured to: turn on the feed pump when an actual temperature of the feed is above the first set temperature; and turn off the feed pump when the actual temperature of the feed is below the second set temperature, wherein the first set temperature is higher than the second set temperature.

14. The system of claim 10, wherein the controller generates a step signal that turns on and off the feed pump, and a duty cycle of the step signal is 50% of a time period of the step signal.

* * * * *